(12) United States Patent
Steinberg et al.

(10) Patent No.: US 7,844,135 B2
(45) Date of Patent: Nov. 30, 2010

(54) DETECTING ORIENTATION OF DIGITAL IMAGES USING FACE DETECTION INFORMATION

(75) Inventors: Eran Steinberg, San Francisco, CA (US); Yury Prilutsky, San Mateo, CA (US); Peter Corcoran, Galway (IE); Petronel Bigioi, Galway (IE); Leo Blonk, Galway (IE); Mihnea Gangea, Bucharest (RO); Constantin Vertan, Bucharest (RO)

(73) Assignee: Tessera Technologies Ireland Limited, Galway (IE)

( * ) Notice: Subject to any disclaimer, the term of this patent is extended or adjusted under 35 U.S.C. 154(b) by 0 days.

(21) Appl. No.: 12/482,305

(22) Filed: Jun. 10, 2009

(65) Prior Publication Data

US 2009/0245693 A1  Oct. 1, 2009

Related U.S. Application Data

(63) Continuation of application No. 11/024,046, filed on Dec. 27, 2004, now Pat. No. 7,565,030, which is a continuation-in-part of application No. 10/608,772, filed on Jun. 26, 2003, now Pat. No. 7,440,593.

(51) Int. Cl.
*G06K 9/32* (2006.01)
*G06K 9/36* (2006.01)
*G06K 9/00* (2006.01)

(52) U.S. Cl. .................. 382/296; 382/297; 382/228; 382/118

(58) Field of Classification Search ............... 382/100, 382/159, 170, 224, 228, 289, 291, 293, 296, 382/297; 345/648–659; 348/583
See application file for complete search history.

(56) References Cited

U.S. PATENT DOCUMENTS 4,047,187 A  9/1977  Mashimo et al.

(Continued)

FOREIGN PATENT DOCUMENTS

EP  578508 A2  1/1994

(Continued)

OTHER PUBLICATIONS

Aoki, Hiroyuki et al., "An Image Storage System Using Complex-Valued Associative Memories, Abstract printed from http://csdl.computer.org/comp/proceedings/icpr/2000/0750/02/07502626abs.htm", Intl. Conf. on Pattern Recognition (ICPR '00), 2000, vol. 2.

(Continued)

*Primary Examiner*—Yon Couso
(74) *Attorney, Agent, or Firm*—Andrew V. Smith

(57) ABSTRACT

A method of automatically establishing the correct orientation of an image using facial information. This method is based on the exploitation of the inherent property of image recognition algorithms in general and face detection in particular, where the recognition is based on criteria that is highly orientation sensitive. By applying a detection algorithm to images in various orientations, or alternatively by rotating the classifiers, and comparing the number of successful faces that are detected in each orientation, one may conclude as to the most likely correct orientation. Such method can be implemented as an automated method or a semi automatic method to guide users in viewing, capturing or printing of images.

36 Claims, 8 Drawing Sheets

U.S. PATENT DOCUMENTS

| | | |
|---|---|---|
| 4,317,991 A | 3/1982 | Stauffer |
| 4,367,027 A | 1/1983 | Stauffer |
| RE31,370 E | 9/1983 | Mashimo et al. |
| 4,448,510 A | 5/1984 | Murakoshi |
| 4,456,354 A | 6/1984 | Mizokami |
| 4,638,364 A | 1/1987 | Hiramatsu |
| 4,690,536 A | 9/1987 | Nakai et al. |
| 4,796,043 A | 1/1989 | Izumi et al. |
| 4,970,663 A | 11/1990 | Bedell et al. |
| 4,970,683 A | 11/1990 | Harshaw et al. |
| 4,975,969 A | 12/1990 | Tal |
| 5,008,946 A | 4/1991 | Ando |
| 5,018,017 A | 5/1991 | Sasaki et al. |
| RE33,682 E | 9/1991 | Hiramatsu |
| 5,051,770 A | 9/1991 | Cornuejols |
| 5,063,603 A | 11/1991 | Burt |
| 5,111,231 A | 5/1992 | Tokunaga |
| 5,130,935 A | 7/1992 | Takiguchi |
| 5,150,432 A | 9/1992 | Ueno et al. |
| 5,161,204 A | 11/1992 | Hutcheson et al. |
| 5,164,831 A | 11/1992 | Kuchta et al. |
| 5,164,992 A | 11/1992 | Turk et al. |
| 5,227,837 A | 7/1993 | Terashita |
| 5,278,923 A | 1/1994 | Nazarathy et al. |
| 5,280,530 A | 1/1994 | Trew et al. |
| 5,291,234 A | 3/1994 | Shindo et al. |
| 5,305,048 A | 4/1994 | Suzuki et al. |
| 5,311,240 A | 5/1994 | Wheeler |
| 5,331,544 A | 7/1994 | Lu et al. |
| 5,353,058 A | 10/1994 | Takei |
| 5,384,615 A | 1/1995 | Hsieh et al. |
| 5,384,912 A | 1/1995 | Ogrinc et al. |
| 5,430,809 A | 7/1995 | Tomitaka |
| 5,432,863 A | 7/1995 | Benati et al. |
| 5,450,504 A | 9/1995 | Calia |
| 5,465,308 A | 11/1995 | Hutcheson et al. |
| 5,488,429 A | 1/1996 | Kojima et al. |
| 5,493,409 A | 2/1996 | Maeda et al. |
| 5,496,106 A | 3/1996 | Anderson |
| 5,543,952 A | 8/1996 | Yonenaga et al. |
| 5,576,759 A | 11/1996 | Kawamura et al. |
| 5,629,752 A | 5/1997 | Kinjo |
| 5,633,678 A | 5/1997 | Parulski et al. |
| 5,638,136 A | 6/1997 | Kojima et al. |
| 5,638,139 A | 6/1997 | Clatanoff et al. |
| 5,652,669 A | 7/1997 | Liedenbaum |
| 5,680,481 A | 10/1997 | Prasad et al. |
| 5,684,509 A | 11/1997 | Hatanaka et al. |
| 5,706,362 A | 1/1998 | Yabe |
| 5,710,833 A | 1/1998 | Moghaddam et al. |
| 5,715,325 A | 2/1998 | Bang et al. |
| 5,724,456 A | 3/1998 | Boyack et al. |
| 5,745,668 A | 4/1998 | Poggio et al. |
| 5,748,764 A | 5/1998 | Benati et al. |
| 5,764,790 A | 6/1998 | Brunelli et al. |
| 5,764,803 A | 6/1998 | Jacquin et al. |
| 5,771,307 A | 6/1998 | Lu et al. |
| 5,774,129 A | 6/1998 | Poggio et al. |
| 5,774,591 A | 6/1998 | Black et al. |
| 5,774,747 A | 6/1998 | Ishihara et al. |
| 5,774,754 A | 6/1998 | Ootsuka |
| 5,781,650 A | 7/1998 | Lobo et al. |
| 5,802,208 A | 9/1998 | Podilchuk et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,842,194 A | 11/1998 | Arbuckle |
| 5,844,573 A | 12/1998 | Poggio et al. |
| 5,850,470 A | 12/1998 | Kung et al. |
| 5,852,669 A | 12/1998 | Eleftheriadis et al. |
| 5,852,823 A | 12/1998 | De Bonet |
| RE36,041 E | 1/1999 | Turk et al. |
| 5,870,138 A | 2/1999 | Smith et al. |
| 5,905,807 A | 5/1999 | Kado et al. |
| 5,911,139 A | 6/1999 | Jain et al. |
| 5,912,980 A | 6/1999 | Hunke |
| 5,966,549 A | 10/1999 | Hara et al. |
| 5,978,519 A | 11/1999 | Bollman et al. |
| 5,990,973 A | 11/1999 | Sakamoto |
| 5,991,456 A | 11/1999 | Rahman et al. |
| 6,009,209 A | 12/1999 | Acker et al. |
| 6,016,354 A | 1/2000 | Lin et al. |
| 6,028,960 A | 2/2000 | Graf et al. |
| 6,035,074 A | 3/2000 | Fujimoto et al. |
| 6,053,268 A | 4/2000 | Yamada |
| 6,061,055 A | 5/2000 | Marks |
| 6,072,094 A | 6/2000 | Karady et al. |
| 6,097,470 A | 8/2000 | Buhr et al. |
| 6,101,271 A | 8/2000 | Yamashita et al. |
| 6,108,437 A | 8/2000 | Lin |
| 6,115,052 A | 9/2000 | Freeman et al. |
| 6,128,397 A | 10/2000 | Baluja et al. |
| 6,128,398 A | 10/2000 | Kuperstein et al. |
| 6,134,339 A | 10/2000 | Luo |
| 6,148,092 A | 11/2000 | Qian |
| 6,151,073 A | 11/2000 | Steinberg et al. |
| 6,173,068 B1 | 1/2001 | Prokoski |
| 6,181,805 B1 | 1/2001 | Koike et al. |
| 6,188,777 B1 | 2/2001 | Darrell et al. |
| 6,192,149 B1 | 2/2001 | Eschbach et al. |
| 6,240,198 B1 | 5/2001 | Rehg et al. |
| 6,246,779 B1 | 6/2001 | Fukui et al. |
| 6,246,790 B1 | 6/2001 | Huang et al. |
| 6,249,315 B1 | 6/2001 | Holm |
| 6,252,976 B1 | 6/2001 | Schildkraut et al. |
| 6,263,113 B1 | 7/2001 | Abdel-Mottaleb et al. |
| 6,268,939 B1 | 7/2001 | Klassen et al. |
| 6,275,614 B1 | 8/2001 | Krishnamurthy et al. |
| 6,278,491 B1 | 8/2001 | Wang et al. |
| 6,282,317 B1 | 8/2001 | Luo et al. |
| 6,292,575 B1 | 9/2001 | Bortolussi et al. |
| 6,301,370 B1 | 10/2001 | Steffens et al. |
| 6,301,440 B1 | 10/2001 | Bolle et al. |
| 6,332,033 B1 | 12/2001 | Qian |
| 6,334,008 B2 | 12/2001 | Nakabayashi |
| 6,349,373 B2 | 2/2002 | Sitka et al. |
| 6,351,556 B1 | 2/2002 | Loui et al. |
| 6,393,136 B1 | 5/2002 | Amir et al. |
| 6,393,148 B1 | 5/2002 | Bhaskar |
| 6,400,830 B1 | 6/2002 | Christian et al. |
| 6,404,900 B1 | 6/2002 | Qian et al. |
| 6,407,777 B1 | 6/2002 | DeLuca |
| 6,421,468 B1 | 7/2002 | Ratnakar et al. |
| 6,426,779 B1 | 7/2002 | Noguchi et al. |
| 6,438,234 B1 | 8/2002 | Gisin et al. |
| 6,438,264 B1 | 8/2002 | Gallagher et al. |
| 6,441,854 B2 | 8/2002 | Fellegara et al. |
| 6,445,810 B2 | 9/2002 | Darrell et al. |
| 6,456,732 B1 | 9/2002 | Kimbell et al. |
| 6,459,436 B1 | 10/2002 | Kumada et al. |
| 6,463,163 B1 | 10/2002 | Kresch |
| 6,473,199 B1 | 10/2002 | Gilman et al. |
| 6,501,857 B1 | 12/2002 | Gotsman et al. |
| 6,502,107 B1 | 12/2002 | Nishida |
| 6,504,546 B1 | 1/2003 | Cosatto et al. |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,156 B1 | 2/2003 | Black et al. |
| 6,526,161 B1 | 2/2003 | Yan |
| 6,529,630 B1 | 3/2003 | Kinjo |
| 6,549,641 B2 | 4/2003 | Ishikawa et al. |
| 6,556,708 B1 | 4/2003 | Christian et al. |
| 6,564,225 B1 | 5/2003 | Brogliatti et al. |

| | | | | | | |
|---|---|---|---|---|---|---|
| 6,567,983 B1 | 5/2003 | Shiimori | | 7,162,101 B2 | 1/2007 | Itokawa et al. |
| 6,587,119 B1 | 7/2003 | Anderson et al. | | 7,171,023 B2 | 1/2007 | Kim et al. |
| 6,606,398 B2 | 8/2003 | Cooper | | 7,171,025 B2 | 1/2007 | Rui et al. |
| 6,633,655 B1 | 10/2003 | Hong et al. | | 7,190,829 B2 | 3/2007 | Zhang et al. |
| 6,661,907 B2 | 12/2003 | Ho et al. | | 7,194,114 B2 | 3/2007 | Schneiderman |
| 6,678,407 B1 | 1/2004 | Tajima | | 7,200,249 B2 | 4/2007 | Okubo et al. |
| 6,697,503 B2 | 2/2004 | Matsuo et al. | | 7,218,759 B1 | 5/2007 | Ho et al. |
| 6,697,504 B2 | 2/2004 | Tsai | | 7,227,976 B1 | 6/2007 | Jung et al. |
| 6,700,999 B1 | 3/2004 | Yang | | 7,254,257 B2 | 8/2007 | Kim et al. |
| 6,714,665 B1 | 3/2004 | Hanna et al. | | 7,269,292 B2 | 9/2007 | Steinberg |
| 6,747,690 B2 | 6/2004 | Molgaard | | 7,274,822 B2 | 9/2007 | Zhang et al. |
| 6,754,368 B1 | 6/2004 | Cohen | | 7,274,832 B2 | 9/2007 | Nicponski |
| 6,754,389 B1 | 6/2004 | Dimitrova et al. | | 7,289,664 B2 | 10/2007 | Enomoto |
| 6,760,465 B2 | 7/2004 | McVeigh et al. | | 7,295,233 B2 | 11/2007 | Steinberg et al. |
| 6,760,485 B1 | 7/2004 | Gilman et al. | | 7,315,630 B2 | 1/2008 | Steinberg et al. |
| 6,765,612 B1 | 7/2004 | Anderson et al. | | 7,315,631 B1 | 1/2008 | Corcoran et al. |
| 6,778,216 B1 | 8/2004 | Lin | | 7,317,815 B2 | 1/2008 | Steinberg et al. |
| 6,792,135 B1 | 9/2004 | Toyama | | 7,321,391 B2 | 1/2008 | Ishige |
| 6,798,834 B1 | 9/2004 | Murakami et al. | | 7,321,670 B2 | 1/2008 | Yoon et al. |
| 6,801,250 B1 | 10/2004 | Miyashita | | 7,324,670 B2 | 1/2008 | Kozakaya et al. |
| 6,801,642 B2 | 10/2004 | Gorday et al. | | 7,324,671 B2 | 1/2008 | Li et al. |
| 6,816,156 B2 | 11/2004 | Sukeno et al. | | 7,336,821 B2 | 2/2008 | Ciuc et al. |
| 6,816,611 B1 | 11/2004 | Hagiwara et al. | | 7,336,830 B2 | 2/2008 | Porter et al. |
| 6,829,009 B2 | 12/2004 | Sugimoto | | 7,352,393 B2 | 4/2008 | Sakamoto |
| 6,850,274 B1 | 2/2005 | Silverbrook et al. | | 7,352,394 B1 | 4/2008 | DeLuca et al. |
| 6,876,755 B1 | 4/2005 | Taylor et al. | | 7,362,210 B2 | 4/2008 | Bazakos et al. |
| 6,879,705 B1 | 4/2005 | Tao et al. | | 7,362,368 B2 | 4/2008 | Steinberg et al. |
| 6,885,760 B2 | 4/2005 | Yamada et al. | | 7,403,643 B2 | 7/2008 | Ianculescu et al. |
| 6,900,840 B1 | 5/2005 | Schinner et al. | | 7,437,998 B2 | 10/2008 | Burger et al. |
| 6,937,773 B1 | 8/2005 | Nozawa et al. | | 7,440,593 B1 | 10/2008 | Steinberg et al. |
| 6,940,545 B1 | 9/2005 | Ray et al. | | 7,460,694 B2 | 12/2008 | Corcoran et al. |
| 6,947,601 B2 | 9/2005 | Aoki et al. | | 7,460,695 B2 | 12/2008 | Steinberg et al. |
| 6,959,109 B2 | 10/2005 | Moustafa | | 7,466,866 B2 | 12/2008 | Steinberg |
| 6,965,684 B2 | 11/2005 | Chen et al. | | 7,469,055 B2 | 12/2008 | Corcoran et al. |
| 6,967,680 B1 | 11/2005 | Kagle et al. | | 7,471,846 B2 | 12/2008 | Steinberg et al. |
| 6,977,687 B1 | 12/2005 | Suh | | 7,502,494 B2 | 3/2009 | Tafuku et al. |
| 6,980,691 B2 | 12/2005 | Nesterov et al. | | 7,515,740 B2 | 4/2009 | Corcoran et al. |
| 6,993,157 B1 | 1/2006 | Oue et al. | | 7,536,036 B2 | 5/2009 | Steinberg et al. |
| 7,003,135 B2 | 2/2006 | Hsieh et al. | | 7,551,211 B2 | 6/2009 | Taguchi et al. |
| 7,020,337 B2 | 3/2006 | Viola et al. | | 7,612,794 B2 | 11/2009 | He et al. |
| 7,024,053 B2 | 4/2006 | Enomoto | | 7,620,214 B2 | 11/2009 | Chen et al. |
| 7,027,619 B2 | 4/2006 | Pavlidis et al. | | 7,623,733 B2 | 11/2009 | Hirosawa |
| 7,027,621 B1 | 4/2006 | Prokoski | | 7,636,485 B2 | 12/2009 | Simon et al. |
| 7,034,848 B2 | 4/2006 | Sobol | | 7,652,693 B2 | 1/2010 | Miyashita et al. |
| 7,035,456 B2 | 4/2006 | Lestideau | | 7,733,388 B2 | 6/2010 | Asaeda |
| 7,035,462 B2 | 4/2006 | White et al. | | 2001/0005222 A1 | 6/2001 | Yamaguchi |
| 7,035,467 B2 | 4/2006 | Nicponski | | 2001/0028731 A1 | 10/2001 | Covell et al. |
| 7,038,709 B1 | 5/2006 | Verghese | | 2001/0031142 A1 | 10/2001 | Whiteside |
| 7,038,715 B1 | 5/2006 | Flinchbaugh | | 2001/0038712 A1 | 11/2001 | Loce et al. |
| 7,039,222 B2 | 5/2006 | Simon et al. | | 2001/0038714 A1 | 11/2001 | Masumoto et al. |
| 7,042,501 B1 | 5/2006 | Matama | | 2002/0081003 A1 | 6/2002 | Sobol |
| 7,042,505 B1 | 5/2006 | DeLuca | | 2002/0093577 A1 | 7/2002 | Kitawaki et al. |
| 7,042,511 B2 | 5/2006 | Lin | | 2002/0105662 A1 | 8/2002 | Patton et al. |
| 7,043,056 B2 | 5/2006 | Edwards et al. | | 2002/0106114 A1 | 8/2002 | Yan et al. |
| 7,043,465 B2 | 5/2006 | Pirim | | 2002/0114535 A1 | 8/2002 | Luo |
| 7,050,607 B2 | 5/2006 | Li et al. | | 2002/0118287 A1 | 8/2002 | Grosvenor et al. |
| 7,057,653 B1 | 6/2006 | Kubo | | 2002/0136433 A1 | 9/2002 | Lin |
| 7,061,648 B2 | 6/2006 | Nakajima et al. | | 2002/0141640 A1 | 10/2002 | Kraft |
| 7,064,776 B2 | 6/2006 | Sumi et al. | | 2002/0150291 A1 | 10/2002 | Naf et al. |
| 7,082,212 B2 | 7/2006 | Liu et al. | | 2002/0150662 A1 | 10/2002 | Dewis et al. |
| 7,088,386 B2 | 8/2006 | Goto | | 2002/0168108 A1 | 11/2002 | Loui et al. |
| 7,099,510 B2 | 8/2006 | Jones et al. | | 2002/0172419 A1 | 11/2002 | Lin et al. |
| 7,106,374 B1 | 9/2006 | Bandera et al. | | 2002/0181801 A1 | 12/2002 | Needham et al. |
| 7,106,887 B2 | 9/2006 | Kinjo | | 2002/0191861 A1 | 12/2002 | Cheatle |
| 7,110,569 B2 | 9/2006 | Brodsky et al. | | 2003/0012414 A1 | 1/2003 | Luo |
| 7,110,575 B2 | 9/2006 | Chen et al. | | 2003/0023974 A1 | 1/2003 | Dagtas et al. |
| 7,113,641 B1 | 9/2006 | Eckes et al. | | 2003/0025812 A1 | 2/2003 | Slatter |
| 7,119,838 B2 | 10/2006 | Zanzucchi et al. | | 2003/0035573 A1 | 2/2003 | Duta et al. |
| 7,120,279 B2 | 10/2006 | Chen et al. | | 2003/0044070 A1 | 3/2003 | Fuersich et al. |
| 7,146,026 B2 | 12/2006 | Russon et al. | | 2003/0044177 A1 | 3/2003 | Oberhardt et al. |
| 7,151,843 B2 | 12/2006 | Rui et al. | | 2003/0048950 A1 | 3/2003 | Savakis et al. |
| 7,158,680 B2 | 1/2007 | Pace | | 2003/0052991 A1 | 3/2003 | Stavely et al. |
| 7,162,076 B2 | 1/2007 | Liu | | 2003/0059107 A1 | 3/2003 | Sun et al. |

| | | |
|---|---|---|
| 2003/0059121 A1 | 3/2003 | Savakis et al. |
| 2003/0071908 A1 | 4/2003 | Sannoh et al. |
| 2003/0084065 A1 | 5/2003 | Lin et al. |
| 2003/0095197 A1 | 5/2003 | Wheeler et al. |
| 2003/0107649 A1 | 6/2003 | Flickner et al. |
| 2003/0117501 A1 | 6/2003 | Shirakawa |
| 2003/0118216 A1 | 6/2003 | Goldberg |
| 2003/0123713 A1 | 7/2003 | Geng |
| 2003/0123751 A1 | 7/2003 | Krishnamurthy et al. |
| 2003/0142209 A1 | 7/2003 | Yamazaki et al. |
| 2003/0151674 A1 | 8/2003 | Lin |
| 2003/0174773 A1 | 9/2003 | Comaniciu et al. |
| 2003/0202715 A1 | 10/2003 | Kinjo |
| 2004/0022435 A1 | 2/2004 | Ishida |
| 2004/0041121 A1 | 3/2004 | Yoshida et al. |
| 2004/0095359 A1 | 5/2004 | Simon et al. |
| 2004/0114904 A1 | 6/2004 | Sun et al. |
| 2004/0120391 A1 | 6/2004 | Lin et al. |
| 2004/0120399 A1 | 6/2004 | Kato |
| 2004/0125387 A1 | 7/2004 | Nagao et al. |
| 2004/0170397 A1 | 9/2004 | Ono |
| 2004/0175021 A1 | 9/2004 | Porter et al. |
| 2004/0179719 A1 | 9/2004 | Chen et al. |
| 2004/0218832 A1 | 11/2004 | Luo et al. |
| 2004/0223063 A1 | 11/2004 | DeLuca et al. |
| 2004/0223649 A1 | 11/2004 | Zacks et al. |
| 2004/0228505 A1 | 11/2004 | Sugimoto |
| 2004/0233301 A1 | 11/2004 | Nakata et al. |
| 2004/0234156 A1 | 11/2004 | Watanabe et al. |
| 2005/0013479 A1 | 1/2005 | Xiao et al. |
| 2005/0013603 A1 | 1/2005 | Ichimasa |
| 2005/0018923 A1 | 1/2005 | Messina et al. |
| 2005/0031224 A1 | 2/2005 | Prilutsky et al. |
| 2005/0036044 A1 | 2/2005 | Funakura |
| 2005/0041121 A1 | 2/2005 | Steinberg et al. |
| 2005/0068446 A1 | 3/2005 | Steinberg et al. |
| 2005/0068452 A1 | 3/2005 | Steinberg et al. |
| 2005/0069208 A1 | 3/2005 | Morisada |
| 2005/0089218 A1 | 4/2005 | Chiba |
| 2005/0104848 A1 | 5/2005 | Yamaguchi et al. |
| 2005/0105780 A1 | 5/2005 | Ioffe |
| 2005/0128518 A1 | 6/2005 | Tsue et al. |
| 2005/0140801 A1 | 6/2005 | Prilutsky et al. |
| 2005/0185054 A1 | 8/2005 | Edwards et al. |
| 2005/0275721 A1 | 12/2005 | Ishii |
| 2006/0006077 A1 | 1/2006 | Mosher et al. |
| 2006/0008152 A1 | 1/2006 | Kumar et al. |
| 2006/0008171 A1 | 1/2006 | Petschnigg et al. |
| 2006/0008173 A1 | 1/2006 | Matsugu et al. |
| 2006/0018517 A1 | 1/2006 | Chen et al. |
| 2006/0029265 A1 | 2/2006 | Kim et al. |
| 2006/0039690 A1 | 2/2006 | Steinberg et al. |
| 2006/0050933 A1 | 3/2006 | Adam et al. |
| 2006/0056655 A1 | 3/2006 | Wen et al. |
| 2006/0093213 A1 | 5/2006 | Steinberg et al. |
| 2006/0093238 A1 | 5/2006 | Steinberg et al. |
| 2006/0098875 A1 | 5/2006 | Sugimoto |
| 2006/0098890 A1 | 5/2006 | Steinberg et al. |
| 2006/0120599 A1 | 6/2006 | Steinberg et al. |
| 2006/0133699 A1 | 6/2006 | Widrow et al. |
| 2006/0140455 A1 | 6/2006 | Costache et al. |
| 2006/0147192 A1 | 7/2006 | Zhang et al. |
| 2006/0153472 A1 | 7/2006 | Sakata et al. |
| 2006/0177100 A1 | 8/2006 | Zhu et al. |
| 2006/0177131 A1 | 8/2006 | Porikli |
| 2006/0187305 A1 | 8/2006 | Trivedi et al. |
| 2006/0203106 A1 | 9/2006 | Lawrence et al. |
| 2006/0203107 A1 | 9/2006 | Steinberg et al. |
| 2006/0204034 A1 | 9/2006 | Steinberg et al. |
| 2006/0204055 A1 | 9/2006 | Steinberg et al. |
| 2006/0204058 A1 | 9/2006 | Kim et al. |
| 2006/0204110 A1 | 9/2006 | Steinberg et al. |
| 2006/0210264 A1 | 9/2006 | Saga |
| 2006/0227997 A1 | 10/2006 | Au et al. |
| 2006/0228037 A1 | 10/2006 | Simon et al. |
| 2006/0257047 A1 | 11/2006 | Kameyama et al. |
| 2006/0268150 A1 | 11/2006 | Kameyama et al. |
| 2006/0269270 A1 | 11/2006 | Yoda et al. |
| 2006/0280380 A1 | 12/2006 | Li |
| 2006/0285754 A1 | 12/2006 | Steinberg et al. |
| 2006/0291739 A1 | 12/2006 | Li et al. |
| 2007/0018966 A1 | 1/2007 | Blythe et al. |
| 2007/0047768 A1 | 3/2007 | Gordon et al. |
| 2007/0053614 A1 | 3/2007 | Mori et al. |
| 2007/0070440 A1 | 3/2007 | Li et al. |
| 2007/0071347 A1 | 3/2007 | Li et al. |
| 2007/0091203 A1 | 4/2007 | Peker et al. |
| 2007/0098303 A1 | 5/2007 | Gallagher et al. |
| 2007/0110305 A1 | 5/2007 | Corcoran et al. |
| 2007/0110417 A1 | 5/2007 | Itokawa |
| 2007/0116379 A1 | 5/2007 | Corcoran et al. |
| 2007/0116380 A1 | 5/2007 | Ciuc et al. |
| 2007/0133901 A1 | 6/2007 | Aiso |
| 2007/0154095 A1 | 7/2007 | Cao et al. |
| 2007/0154096 A1 | 7/2007 | Cao et al. |
| 2007/0160307 A1 | 7/2007 | Steinberg et al. |
| 2007/0189748 A1 | 8/2007 | Drimbarean et al. |
| 2007/0189757 A1 | 8/2007 | Steinberg et al. |
| 2007/0201724 A1 | 8/2007 | Steinberg et al. |
| 2007/0201725 A1 | 8/2007 | Steinberg et al. |
| 2007/0201726 A1 | 8/2007 | Steinberg et al. |
| 2007/0263104 A1 | 11/2007 | DeLuca et al. |
| 2007/0273504 A1 | 11/2007 | Tran |
| 2007/0296833 A1 | 12/2007 | Corcoran et al. |
| 2008/0002060 A1 | 1/2008 | DeLuca et al. |
| 2008/0013798 A1 | 1/2008 | Ionita et al. |
| 2008/0013799 A1 | 1/2008 | Steinberg et al. |
| 2008/0013800 A1 | 1/2008 | Steinberg et al. |
| 2008/0043121 A1 | 2/2008 | Prilutsky et al. |
| 2008/0043122 A1 | 2/2008 | Steinberg et al. |
| 2008/0049970 A1 | 2/2008 | Ciuc et al. |
| 2008/0055433 A1 | 3/2008 | Steinberg et al. |
| 2008/0075385 A1 | 3/2008 | David et al. |
| 2008/0143854 A1 | 6/2008 | Steinberg et al. |
| 2008/0144966 A1 | 6/2008 | Steinberg et al. |
| 2008/0175481 A1 | 7/2008 | Petrescu et al. |
| 2008/0186389 A1 | 8/2008 | DeLuca et al. |
| 2008/0205712 A1 | 8/2008 | Ionita et al. |
| 2008/0219517 A1 | 9/2008 | Blonk et al. |
| 2008/0240555 A1 | 10/2008 | Nanu et al. |
| 2008/0266419 A1 | 10/2008 | Drimbarean et al. |
| 2008/0267461 A1 | 10/2008 | Ianculescu et al. |
| 2008/0292193 A1 | 11/2008 | Bigioi et al. |
| 2008/0316327 A1 | 12/2008 | Steinberg et al. |
| 2008/0316328 A1 | 12/2008 | Steinberg et al. |
| 2008/0317339 A1 | 12/2008 | Steinberg et al. |
| 2008/0317357 A1 | 12/2008 | Steinberg et al. |
| 2008/0317378 A1 | 12/2008 | Steinberg et al. |
| 2008/0317379 A1 | 12/2008 | Steinberg et al. |
| 2009/0002514 A1 | 1/2009 | Steinberg et al. |
| 2009/0003652 A1 | 1/2009 | Steinberg et al. |
| 2009/0003661 A1 | 1/2009 | Ionita et al. |
| 2009/0003708 A1 | 1/2009 | Steinberg et al. |
| 2009/0052749 A1 | 2/2009 | Steinberg et al. |
| 2009/0052750 A1 | 2/2009 | Steinberg et al. |
| 2009/0080713 A1 | 3/2009 | Bigioi et al. |
| 2009/0087030 A1 | 4/2009 | Steinberg et al. |
| 2009/0087042 A1 | 4/2009 | Steinberg et al. |
| 2009/0102949 A1 | 4/2009 | Steinberg et al. |
| 2009/0175609 A1 | 7/2009 | Tan |
| 2009/0196466 A1 | 8/2009 | Capata et al. |

FOREIGN PATENT DOCUMENTS

| | | |
|---|---|---|
| EP | 984386 A2 | 3/2000 |
| EP | 1128316 A1 | 8/2001 |

| | | | |
|---|---|---|---|
| EP | 1398733 A1 | 3/2004 |
| EP | 1441497 A2 | 7/2004 |
| EP | 1453002 A2 | 9/2004 |
| EP | 1626569 A1 | 2/2006 |
| EP | 1785914 A1 | 5/2007 |
| EP | 1887511 A1 | 2/2008 |
| EP | 2033142 A2 | 3/2009 |
| EP | 2052349 A1 | 4/2009 |
| GB | 2370438 A1 | 6/2002 |
| JP | 5260360 A2 | 10/1993 |
| JP | 2005-164475 A2 | 6/2005 |
| JP | 2006-005662 A2 | 1/2006 |
| JP | 2006-254358 A2 | 9/2006 |
| WO | WO 00/76398 A1 | 12/2000 |
| WO | WO-0133497 A1 | 5/2001 |
| WO | WO-02052835 A2 | 7/2002 |
| WO | WO-03028377 A1 | 4/2003 |
| WO | WO-2006045441 A1 | 5/2006 |
| WO | WO-2007095477 A2 | 8/2007 |
| WO | WO-2007095477 A3 | 8/2007 |
| WO | WO-2007095483 A2 | 8/2007 |
| WO | WO-2007095553 A2 | 8/2007 |
| WO | WO-2007095553 A3 | 8/2007 |
| WO | WO 2007/128117 A1 | 11/2007 |
| WO | WO-2007142621 A1 | 12/2007 |
| WO | WO-2008015586 A2 | 2/2008 |
| WO | WO-2008015586 A3 | 2/2008 |
| WO | WO-2008017343 A1 | 2/2008 |
| WO | WO-2008018887 A1 | 2/2008 |
| WO | WO-2008023280 A2 | 2/2008 |
| WO | WO-2008054422 A2 | 5/2008 |
| WO | WO-2008104549 A2 | 9/2008 |
| WO | WO-2008107002 A1 | 9/2008 |
| WO | WO-2008107112 A2 | 9/2008 |
| WO | WO-2008131823 A1 | 11/2008 |
| WO | WO-2008150285 A1 | 12/2008 |
| WO | WO-2008157792 A1 | 12/2008 |
| WO | WO-2009039876 A1 | 4/2009 |

OTHER PUBLICATIONS

Batur et al., "Adaptive Active Appearance Models", IEEE Transactions on Image Processing, 2005, pp. 1707-1721, vol, 14—Issue 11.

Beraldin, J.A. et al., "Object Model Creation from Multiple Range Images: Acquisition, Calibration, Model Building and Verification, Abstract printed from http://csdl.computer.org/comp/proceedings/nrc/1997/7943/00/79430326abs.htm", International Conference on Recent Advances in 3-D Digital Imaging and Modeling, 1997.

Beymer, David, "Pose-Invariant face Recognition Using Real and Virtual Views, A.I. Technical Report No. 1574", Massachusetts Institute of Technology Artificial Intelligence Laboratory, 1996, pp. 1-176.

Bradski Gary et al., "Learning-Based Computer Vision with Intel's Open Source Computer Vision Library", Intel Technology, 2005, pp. 119-130, vol. 9—Issue 2.

Buenaposada, J., "Efficiently estimating 1-3,16 facial expression and illumination in appearance—based tracking, Retrieved from the Internet URL:http://www.bmva.ac.uk/bmvc/2006/ [retrieved on Sep. 1, 2008]", Proc. British machine vision conference, 2006.

Chang, T., "Texture Analysis and Classification with Tree-Structured Wavelet Transform", IEEE Transactions on Image Processing, 1993, pp. 429-441, vol. 2—Issue 4.

Cootes T. et al., Modeling Facial Shape and Appearance, S. Li and K. K. Jain (Eds.): "Handbook of face recognition", XP002494037, 2005, Chapter 3, Springer.

Cootes, T.F. et al., "A comparative evaluation of active appearance model algorithms", Proc. 9th Brit. Machine Vision Conf. Brit. Machine Vision Association, 1998, pp. 680-689.

Cootes, T.F. et al., "On representing edge structure for model matching", Proc. IEEE Computer Vision and Pattern Recognition, 2001, pp. 1114-1119.

Corcoran, P. et al., "Automatic Indexing of Consumer Image Collections Using Person Recognition Techniques", Digest of Technical Papers. International Conference on Consumer Electronics, 2005, pp. 127-128.

Costache, G. et al., "In-Camera Person-Indexing of Digital Images", Digest of Technical Papers. International Conference on Consumer Electronics, 2006, pp. 339-340.

Crowley, J. et al., "Multi-modal tracking of faces for video communication, http://citeseer.ist.psu.edu/crowley97multimodal.html", In Computer Vision and Patent Recognition, 1997.

Dalton, John, "Digital Cameras and Electronic Color Image Acquisition, Abstract printed from http://csdl.computer.org/comp/proceedings/compcon/1996/7414/00/74140431abs.htm", COMPCOM Spring '96—41st IEEE International Conference, 1996.

Demirkir, C. et al., "Face detection using boosted tree classifier stages", Proceedings of the IEEE 12th Signal Proc. and Comm. Applications Conference, 2004, pp. 575-578.

Deng, Ya-Feng et al., "Fast and Robust face detection in video, http://rlinks2.dialog.com/NASApp/ChannelWEB/DialogProServlet?ChName=engineering", International Conference on Machine Learning and Cybernetics, 2005.

Donner, Rene et al., "Fast Active Appearance Model Search Using Canonical Correlation Analysis", IEEE Transactions on Pattern Analysis and Machine Intelligence, 2006, pp. 1690-1694, vol. 28—Issue 10.

Drimbarean, A.F. et al., "Image Processing Techniques to Detect and Filter Objectionable Images based on Skin Tone and Shape Recognition", International Conference on Consumer Electronics, 2001, pp. 278-279.

Edwards, G.J. et al., "Advances in active appearance models", International Conference on Computer Vision (ICCV'99), 1999, pp. 137-142.

Edwards, G.J. et al., "Learning to identify and track faces in image sequences, Automatic Face and Gesture Recognition", IEEE Comput. Soc, 1998, pp. 260-265.

EPO Communication pursuant to Article 94(3) EPC, for European Patent Application No. 05 792 584.4. paper dated May 13, 2008, 8 pages.

Feraud, R. et al., "A Fast and Accurate Face Detector Based on Neural Networks", IEEE Trans. on Pattern Analysis and Machine Intell., 2001, pp. 42-53, vol. 23—Issue 1.

Fernandez, Anna T. et al., "Synthetic Elevation Beamforming and Image Acquisition Capabilities Using an 8x 128 1.75D Array, Abstract Printed from http://www.ieee-uffc.org/archive/uffc/trans/toc/abs/03/t0310040.htm", The Technical Institute of Electrical and Electronics Engineers, 2002.

Froba, B. et al., "Face detection with the modified census transform", Proceedings of the Sixth IEEE International Conference on Automatic Face and Gesture Recognition, 2004, pp, 91-96.

Froba, B. et al., "Real time face detection, Kauai, Hawai Retrieved from the Internet:URL:http://www.embassi.de/publi/veroeffent/Froeba.pdf [retrieved on Oct. 23, 2007]", Dept. of Applied Electronics, Proceedings of lasted "Signal and Image Processing", 2002, pp, 1-6.

Gangaputra, Sachin et al., "A Unified Stochastic Model for Detecting and Tracking Faces, http://portal.acm.org/citation.cfm?id=1068818&coll=GUIDE&dl=GUIDE&CF-ID=6809268&CFTOKEN=82843223", Proceedings of the The 2nd Canadian Conference on Computer and Robot Vision (CRV 2005), 2005, pp. 306-313, vol. 00, IEEE Comp. Soc.

Garnaoui, H.H. et al., "Visual Masking and the Design of Magnetic Resonance Image Acquisition, Abstract printed from http://csdl.computer.org/comp/proceedings/icip/1995/7310/01/73100625abs.htm", International Conf. on Image Processing, 1995, vol. 1.

Gaubatz, Matthew et al., "Automatic Red-Eye Detection and Correction", IEEE ICIP, Proceedings 2002 International Conference on Image Processing, 2002, pp. 1-804-1-807, vol. 2—Issue 3.

Gerbrands, J., "On the Relationships Between SVD, KLT, and PCA", Pattern Recognition. 1981, pp. 375-381, vol. 14, Nos. 1-6.

Goodall, C. "Procrustes Methods in the Statistical Analysis of Shape, Stable URL: http://www.jstor.org/stable/2345744", Journal of the Royal Statistical Society. Series B (Methodological), 1991, pp. 285-339, vol. 53—Issue 2, Blackwell Publishing for the Royal Statistical Society.

Hayashi, S. et al., "A Detection Technique for Degraded Face Images", Conference on Computer Vision and Pattern Recognition, 2006, pp. 1506 1512, vol. 2, IEEE Comp. Soc.

Heisele, B. et al., "Hierarchical Classification and Feature Reduction for Fast Face Detection with Support Vector Machines", Pattern Recognition, 2003, pp. 2007-2017, vol. 36—Issue 9, Elsevier.

Hou, Xinwen et al., "Direct Appearance Models", IEEE, 2001, pp. I-828-I-833.

Hu, Wen-Chen et al., "A Line String Image Representation for Image Storage and Retrieval, Abstract printed from http://csdl.computer.oro/comp/proceedings/icmcs/1997/7819/00/78190434abs.htm", Intl Conf. on Multimedia Computing and systems, 1997.

Huang et al., "Image Indexing Using Color Correlograms", Proceedings of the 1997 Conference on Computer Vision and Pattern Recognition (CVPR '97), 1997, pp. 762.

Huang, J. et al., "Detection of human faces using decision trees, http://doLieeecomputersociety,org/10.1109/Recognition", 2nd International Conference on Automatic Face and Gesture Recognition (FG '96), IEEE Xplore, 2001, p. 248.

Huber, Reinhold et al., "Adaptive Aperture Control for Image Acquisition, Abstract printed from http://csdl.computer.org/comp/proceedings/wacv/2002/1858/00/18580320abs.htm.", Sixth IEEE Workshop on Appls of Comp. Vision. 2002.

Isukapalli, Ramana et al., "Learning a dynamic classification method to detect faces and identify facial expression, http://rlinks2,diaiog.com/NASApp/ChannelWEB/DialogProServlet?ChName=engineering", Intl Workshop on Analysis and Modelling of Faces and Gestures, AMFG 2005, In Lecture Notes in Computer Science, 2005, vol. 3723.

Jebara, Tony S. et al., "3D Pose Estimation and Normalization for Face Recognition, A Thesis submitted to the Faculty of Graduate Studies and Research in Partial fulfillment of the requirements of the degree of Bachelor of Engineering", Department of Electrical Engineering, 1996, pp. 1-121, McGill University.

Jones, M et al., "Fast multi-view face detection, http://www.merl.com/papers/docs/TR2003-96.pdf", Mitsubishi Electric Research Lab, 2003, 10 pgs.

Kang, Sing Bing et al., "A Multibaseline Stereo System with Active Illumination and Real-Time Image Acquisition, Abstract printed from http://csdl.computer.org/comp/proceedings/iccv/1995/7042/00/70420068abs.htm", Fifth Intl Conf on Computer Vision, 1995.

Kita, Nobuyuki et al., "Archiving Technology for Plant Inspection Images Captured by Mobile Active Cameras—4D Visible Memory, Abstract printed from http://csdl.computer.org/comp/proceedings/3dpvt/2002/1521/00/15210208abs.htm", 1st Intl Symp on 3D Data Processing Visualization and Transmission (3DPVT '02), 2002.

Kouzani, A.Z., "Illumination-Effects Compensation in Facial Images Systems", Man and Cybernetics, IEEE SMC '99 Conference Proceedings, 1999, pp. VI-840-VI-844, vol. 6.

Kozubek, Michal et al., "Automated Multi-view 3D Image Acquisition in Human Genome Research, Abstract printed from http://csdl.computer.org/comp/proceedings/3pvt/2002/1521/00/15210091abs.htm", 1st International Symposium on 3D Data Processing Visualization and Transmission (3DPVT '02), 2002.

Krishnan, Arun, "Panoramic Image Acquisition, Abstract printed from http://csdl.computer.org/comp/proceedings/cvpr/1996/7258/00/72580379abs.htm", Conference on Computer Vision and Pattern Recognition (CVPR '96), 1996.

Lai, J.H. et al., "Face recognition using holistic Fourier in variant features, http://digitalimaging.inf.brad.ac.uk/publication/pr34-1.pdf", Pattern Recognition, 2001, pp. 95-109, vol. 34.

Lei et al., "A CBIR Method Based on Color-Spatial Feature", IEEE Region 10th Ann. Int. Conf., 1999.

Lienhart, R. et al., "A Detector Tree of Boosted Classifiers for Real-Time Object Detection and Tracking", Proceedings of the 2003 International Conference on Multimedia and Expo, 2003, pp. 277-280, vol. 1, IEEE Computer Society.

Matkovic, Kresimir et al., "The 3D Wunderkammer an Indexing by Placing Approach to the Image Storage and Retrieval, Abstract printed from http://csdl.computer,org/comp/proceedings/tocg/2003/1942/00/19420034abs.htm", Theory and Practice of Computer Graphics, 2003, University of Birmingham.

Mathews, I. et al., "Active appearance models revisited, Retrieved from http://www.d.cmu.edu/pub_files/pub4/matthews_iain_2004_2/matthews_iain_2004_2.pdf", International Journal of Computer Vision, 2004, pp. 135-164, vol. 60—Issue 2.

Mekuz, N. et al., "Adaptive Step Size Window Matching for Detection", Proceedings of the 18th International Conference on Pattern Recognition, 2006, pp. 259-262. vol. 2.

Mitra, S. et al., "Gaussian Mixture Models Based on the Frequency Spectra for Human Identification and Illumination Classification", Proceedings of the Fourth IEEE Workshop on Automatic Identification Advanced Technologies, 2005, pp. 245-250.

Moghaddam, Baback et al., "Bayesian Modeling of Facial Similarity, http://citeseer.ist.psu.edu/article/moghaddam98bayesian.html", Advances in Neural Information Processing Systems (NIPS 1998), 1998 pp. 910-916.

Nayak et al., "Automatic illumination correction for scene enhancement and objection tracking, XP005600656, ISSN: 0262- 8856", Image and Vision Computing, 2006, pp. 949-959, vol. 24—Issue 9.

Non-Final Office Action mailed Aug. 19, 2009, for U.S. Appl. No. 11/773,815, filed Jul. 5, 2007.

Non-Finai Office Action mailed Aug. 20, 2009, for U.S. Appl. No. 11/773,855, filed Jul. 5, 2007.

Non-Final Office Action mailed Sep. 8, 2009, for U.S. Appl. No. 11/688,236, filed Mar. 19, 2007.

Nordstrom, M.M. et al., "The IMM face database an annotated dataset of 240 face images, http://www2.imm.dtu.dk/pubdb/p.php?3160", Informatics and Mathematical Modelling 2004.

Ohta, Y-I et al., "Color Information for Region Segmentation, XP008026458", Computer Graphics and Image Processing, 1980, pp. 222-241, vol. 13—Issue 3, Academic Press.

Park, Daechul et al., "Lenticular Stereoscopic Imaging and Displaying Techniques with no Special Glasses, Abstract printed from http://csdl.computer.org/comp/proceedings/icip/1995/7310/03/73103137abs.htm", Intl Conf on Image Processing, 1995, vol. 3.

PCT International Preliminary Report on Patentability (IPRP) for PCT Application PCT/EP2005/011010, dated Jan. 23, 2007, 18 pages.

PCT International Preliminary Report on Patentability (IPRP) for PCT Application PCT/EP2007/009763, dated Sep. 11, 2009, 8 pages.

PCT International Search Report and Written Opinion of the International Searching Authority, or the Declaration, for PCT Application No. PCT/US2006/021393, filed Jun. 2, 2006, paper dated Mar. 29, 2007, 12 pgs.

PCT International Search Report and Written Opinion of the International Searching Authority, or the Declaration, for PCT Application No. PCT/US2006/060392, filed Oct. 31, 2006, paper dated Sep. 19, 2008, 9 pgs.

PCT Invitation to Pay Additional Fees and, Where Applicable Protest Fee, for PCT Application No. PCT/EP2008/001578, paper dated Jul. 8, 2008, 5 Pages.

PCT Notification of Transmittal of the International Search Report and the Written Opinion of the International Searching Authority, or the Declaration for PCT Application No. PCT/US2006/032959, dated Mar. 6, 2007, 8 pages.

PCT Notification of Transmittal of the International Search Report and the Written Opinion of the International Searching Authority, or the Declaration for PCT/EP/2005/011010, dated Jan. 23, 2006, 14 pages.

PCT Notification of Transmittal of the International Search Report and the Written Opinion of the International Searching Authority, or the Declaration, for PCT Application No. PCT/EP2007/005330, filed Jun. 18, 2007, paper dated Sep. 28, 2007, 11 pages.

PCT Notification of Transmittal of the International Search Report and the Written Opinion of the International Searching Authority, or the Declaration, for PCT Application No. PCT/EP2007/006540, Nov. 8, 2007. 11 pgs.

PCT Notification of Transmittal of the International Search Report and the Written Opinion of the International Searching Authority, or the Declaration, for PCT Application No. PCT/EP2007/009763, paper dated Jun 17, 2008, 11 pages.

PCT Notification of Transmittal of the International Search Report and the Written Opinion of the International Searching Authority, or the Declaration, for PCT Application No. PCT/EP2008/001510, dated May 29, 2008, 13 pages.

PCT Notification of Transmittal of the International Search Report and the Written Opinion of the International Searching Authority, or the Declaration, for PCT Application No. PCT/EP2008/052329, dated Sep. 15, 2008, 12 pages.

PCT Notification of Transmittal of the International Search Report and the Written Opinion of the International Searching Authority, or the Declaration, for PCT Application No, PCT/IB2007/003724, dated Aug. 28, 2008, 9 pages.

PCT Notification of Transmittal of the International Search Report and the Written Opinion of the International Searching Authority, or the Declaration, for PCT Application No. PCT/US2008/067746, dated Sep. 10, 2008, 8 pages.

Romdhani, S. et al., "Face Identification by Fitting a 3D Morphable Model using linear Shape and Texture Error Functions, XP003018283", Eur. Conf. on Computer Vision, 2002, pp. 1-15.

Roux, Sebastien et al., "Embedded Convolutional Face Finder,Multimedia and Expo, XP031032328, ISBN: 978-1-4244-0366-0", IEEE Intl Conf on IEEE, 2006, pp. 285-288.

Rowley, Henry A. et al., "Neural network-based face detection, ISSN: 0162-8828, DOI: 10.1109/34.655647, Posted online: Aug. 6, 2002. http://ieeexplore.ieee,org/xpl/freeabs_ all.jsp?arnumber-655647andisnumber-14286", IEEE Transactions on Pattern Analysis and Machine Intelligence, 1998, pp. 23-38, p. 92, vol. 20—Issue 1.

Ryu, Hanjin et al., "Coarse-to-Fine Classification for Image-Based Face Detection", Image and video retrieval lecture notes in Computer science, 2006, pp. 291-299, vol. 4071, Springer-Verlag.

Sahba, F. et al., "Filter Fusion for Image Enhancement Using Reinforcement Learning, XP010654204, ISBN: 0-7803-7781-8", Canadian Conference on Electrical and computer Engineering, 2003, pp. 847-850, vol. 3.

Shand, M., "Flexible Image Acquisition Using Reconfigurable Hardware, Abstract printed from http://csdl.computer.org/comp/proceedings/fccm/1995/7086/00/70860125abs.htm", IEEE Symposium of FPGA's for Custom Computing Machines (FCCM '95), 1995.

Sharma, G. et al., "Digital color imaging, [Online]. Available: citeseer.ist.psu.edu/sharma97digital.html", IEEE Transactions on Image Processing, 1997, pp, 901-932, vol. 6—Issue 7.

Shock, D. et al., "Comparison of Rural Remote Site Production of Digital Images Employing a film Digitizer or a Computed Radiography (CR) System, Abstract printed from http://csdl.computer.org/comp/proceedings/imac/1995/7560/00/7560007 1abs. htm", 4th International Conference on Image Management and Communication ( IMAC '95), 1995.

Sim, T. et al., "The CMU Pose, Illumination, and Expression (PIE) Database of Human Faces Robotics Institute, Tech. Report, CMU-RI-TR-01-02", 2001, 18 pgs, Carnegie Mellon University.

Sim, T. et al., "The CMU Pose, Illumination, and Expression (PIE) database, Automatic Face and Gesture Recognition", Fifth IEEE Intl. Conf, IEEE Piscataway, NJ, 2002, 6 pgs.

Skocaj, Danijel, "Range Image Acquisition of Objects with Non-Uniform Albedo Using Structured Light Range Sensor, Abstract printed from http://csdl.computer.org/comp/proceedings/icpr/2000/0750/01/07501778abs.htm", International Conference on Pattern Recognition (ICPR '00), 2000, vol. 1.

Smeraldi, F. et al., "Facial feature detection by saccadic exploration of the Gabor decomposition, XP010586874", Image Processing, ICIP 98. Proceedings International Conference On Chicago, IL, USA, IEEE Comput. Soc, 1998, pp. 163-167, vol. 3.

Song, Hong et al., "Face detection and segmentation for video surveillance Language: Chinese. http://rlinks2.dialog.com/NASApp/ChannelWEB/DialogProServlet?ChName=engineering", Binggong Xuebao/Acta Armamentarii, 2006, pp. 252-257, vol. 27—Issue 2.

Soriano, M. et al., "Making Saturated Facial Images Useful Again, XP002325961, ISSN: 0277-786X", Proceedings of the SPIE, 1999, pp. 113-121, vol. 3826.

Stegmann, M.B. et al., "A flexible appearance modelling environment, Available: http://www2.imm.dtu.dk/pubdb/p.php?1918", IEEE Transactions on Medical Imaging, 2003, pp. 1319-1331, vol. 22—Issue 10.

Stegmann, M.B. et al., "Multi-band modelling of appearance, XP009104697", Image and Vision Computing, 2003, pp. 61-67, vol. 21—Issue 1.

Stricker et al., "Similarity of color images", SPIE Proc, 1995, pp. 1-12, vol. 2420.

Sublett, J.W. et al., "Design and Implementation of a Digital Teleultrasound System for Real-Time Remote Diagnosis, Abstract printed from http://csdl.computer.org/comp/proceedings/cbms/1995/7117/00/71170292abs.htm", Eight Annual IEEE Symposium on Computer-Based Medical Systems (CBMS '95), 1995.

Tang, Yuan Y. et al., "Information Acquisition and Storage of Forms in Document Processing, Abstract printed from http://csdl.computer.org/comp/proceedings/icdar/1997/7898/00/78980170abs.htm", 4th International Conference Document Analysis and Recognition, 1997, vol. I and II.

Tjahyadi et al., "Application of the DCT Energy Histogram for Face Recognition", Proceedings of the 2nd Intl Conf on Information Tech. for Application, 2004, pp. 305-310.

Tkalcic, M. et al., "Colour spaces perceptual, historical and applicational background, ISBN: 0-7803-7763-X", IEEE, EUROCON, 2003, pp. 304- 308, vol. 1.

Turk, Matthew et al., "Eigenfaces for Recognition", Journal of Cognitive Neuroscience, 1991, 17 pgs, vol. 3—Issue 1.

Turkan, Mehmet et al., "Human face detection in video using edge projections, Conference: Visual Information Processing XV, http://rlinks2.dialog,com/NASApp/ChannelWEB/DialogProServlet?ChName=engineering", Proceedings of SPIE—The International Society for Optical Engineering Visual Information Processing, 2006, vol. 6246.

Twins Crack Face Recognition Puzzle, Internet article http://www.cnn.com/2003/TECH/ptech/03/10/israel.twins.reut/index.html, printed Mar. 10, 2003, 3 pages.

U.S. Appl. No. 11/464,083, filed Aug. 11, 2006.

U.S. Appl. No. 11/554,539, filed Oct. 30, 2006, entitled Digital Image Processing Using Face Detection And Skin Tone Information.

U.S. Appl. No. 60/821,165, filed Aug. 2, 2006.

Viola, P. et al., "Rapid Object Detection using a Boosted Cascade of Simple Features", Proceedings of the 2001 IEEE Computer Society Conference on Computer Vision and Pattern Recognition, 2001, pp. I-511-I-518, vol. 1.

Viola, P. et al., "Robust Real-Time Face Detection", International Journal of Computer Vision, 2004, pp. 137-154, vol. 57—Issue 2, Kluwer Academic Publishers.

Vuylsteke, P. et al., "Range Image Acquisition with a Single Binary-Encoded Light Pattern, abstract printed from http://csdl.computer.org/comp/trans/tp/1990/02/i0148abs.htm", IEEE Transactions on Pattern Analysis and Machine Intelligence, 1990, 1 page.

Wan, S.J. et al., "Variance-based color image quantization for frame buffer display", S. K. M. Wong Color Research & Application, 1990, pp. 52-58, vol. 15—Issue 1.

Xin He et al., "Real-Time Human Face Detection in Color Image", International Conference on Machine Learning and Cybernetics, 2003, pp. 2915-2920, vol. 5.

Yang, Ming Hsuan et al., "Face Detection and Gesture Recognition for Human-Computer Interaction", 2004, p. 33-p. 35, Kluwer Academic.

Yang, Ming-Hsuan et al., "Detecting Faces in Images: A Survey, ISSN:0162-8828, http://portal.acm.org/citation.cfm?id=505621&coll=GUIDE&dl=GUIDE&CFID=680-9268&CFTOKEN=82843223.", IEEE Transactions on Pattern Analysis and Machine Intelligence archive, 2002, pp. 34-58, vol. 24— Issue 1, IEEE Computer Society.

Zhang, Jun et al., "Face Recognition: Eigenface, Elastic Matching, and Neural Nets", Proceedings of the IEEE, 1997, pp. 1423-1435, vol. 85—Issue 9.

Zhao, W. et al., "Face recognition: A literature survey, ISSN: 0360-0300, http://portal.acm.org/citation.cfm?id=954342&coll=GUIDE&dl=GUIDE&CFID=680-9268&CFTOKEN=82843223.", ACM Computing Surveys (CSUR) archive, 2003, pp. 399-458, vol. 35—Issue 4, ACM Press.

Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.
Co-pending U.S. Appl. No. 12/790,594, filed May 28, 2010.
Co-pending U.S. Appl. No. 12/825,280, filed Jun. 28, 2010.
Co-pending U.S. Appl. No. 12/843,805, filed Jul. 26, 2010.
Final Office Action mailed Mar. 23, 2010, for U.S. Appl. No. 11/688,236, filed Mar. 19, 2007.
Final Office Action mailed Nov. 18, 2009, for U.S. Appl. No. 11/554,539, filed Oct. 30, 2006.
Final Office Action mailed Sep. 1, 2010, for U.S. Appl. No. 10/608,784, filed Jun 26, 2003.
Machin, et al., "Real Time Facial Motion Analysis for Virtual Teleconferencing," IEEE, 1996, pp. 340-344.
Ming, et al., "Human Face Orientation Estimation Using Symmetry and Feature Points Analysis," IEEE, 2000, pp. 1419-1422.
Non-Final Office Action mailed Apr. 2, 2010, for U.S. Appl. No. 10/608,784, filed Jun 26, 2003.
Non-Final Office Action mailed Apr. 30, 2010, for U.S. Appl. No. 11/765,899, filed Jun. 20, 2007.
Non-Final Office Action mailed Aug. 2, 2010, for U.S. Appl. No. 11/688,236, filed Mar. 19, 2007.
Non-Final Office Action mailed Jan. 20, 2010, for U.S. Appl. No. 12/262,024, filed Oct. 30, 2008.
Non-Final Office Action mailed Jun. 14, 2010, for U.S. Appl. No. 11/624,683, filed Jan. 18, 2007.
Non-Final Office Action mailed Jun. 22, 2010, for U.S. Appl. No. 12/055,958, filed Mar. 26, 2008.
Non-Final Office Action mailed Jun. 23, 2010, for U.S. Appl. No. 11/941,156, filed Nov. 18, 2007.
Non-Final Office Action mailed May 12, 2010, for U.S. Appl. No. 11/554,539, filed Oct. 30, 2007.
Notice of Allowance mailed Aug. 23, 2010, for U.S. Appl. No. 12/262,024, filed Oct. 30, 2008.
Notice of Allowance mailed Jun. 10, 2010, for U.S. Appl. No. 12/262,024, filed Oct. 30, 2008.
Notice of Allowance mailed Sep. 2, 2010, for U.S. Appl. No. 12/262,071, filed Oct. 30, 2008.
Notice of Allowance mailed Sep. 3, 2010, for U.S. Appl. No. 12/262,061, filed Oct. 30, 2008.
Notice of Allowance mailed Sep. 8, 2010, for U.S. Appl. No. 11/554,539, filed Oct. 30, 2006.
PCT Notification of Transmittal of the International Search Report and the Written Opinion of the International Searching Authority, or the Declaration, for PCT Application No. PCT/EP2009/005461, dated Apr. 20, 2010, 12 pages.
Yao, Christina: "Image Cosmetics: An automatic Skin Exfoliation Framework on Static Images" UCSB Four Eyes Lab Imaging, Interaction, and Innovative Interfaces Publications Thesis, Master of Science in Media Arts and Technology Dec. 2005, pp. 1-83, Retrieved from the Internet : URL: http://ilab.cs.ucsb.edu/publications/YaoMS.pdf.

DETECTING ORIENTATION OF DIGITAL IMAGES USING FACE DETECTION INFORMATION

PRIORITY

This application is a Continuation of U.S. patent application Ser. No. 11/024,046, filed Dec. 27, 2004, now U.S. Pat. No. 7,565,030, which is a Continuation in Part of U.S. patent application Ser. No. 10/608,772, filed Jun. 26, 2003, now U.S. Pat. No. 7,440,593, hereby incorporated by reference.

BACKGROUND

1. Field of the Invention

The invention relates to automatic suggesting or processing of enhancements of a digital image using information gained from identifying and analyzing faces appearing within the image, and in particular method of detection the image orientation using face detection. The invention provides automated orientation detection for photographs taken and/or images detected, acquired or captured in digital form or converted to digital form, by using information about the faces in the photographs and/or images.

2. Description of the Related Art

Viola and Jones in the paper entitled "Robust Real Time Object Detection" as presented in the $2^{nd}$ international workshop on Statistical and Computational theories of Vision, in Vancouver, Canada, Jul. 31, 2001, describe a visual object detection framework that is capable of processing images extremely rapidly while achieving high detection rates. The paper demonstrates this framework by the task of face detection. The technique is based on a learning technique where a small number of critical visual features yield a set of classifiers.

Yang et al., IEEE Transactions on Pattern Analysis and Machine Intelligence, Vol. 24, No. 1, pages 34-58, give a useful and comprehensive review of face detection techniques January 2002. These authors discuss various methods of face detection which may be divided into four main categories: (i) knowledge-based methods; (ii) feature-invariant approaches, including the identification of facial features, texture and skin color; (iii) template matching methods, both fixed and deformable and (iv) appearance based methods, including eigenface techniques, statistical distribution based methods and neural network approaches. They also discuss a number of the main applications for face detections technology. It is recognized in the present invention that none of the prior art describes or suggests using detection and knowledge of faces in images to create and/or use tools for the enhancement or correction of the images according to the invention as set forth in the claims below, nor as described in detail below as preferred and alternative embodiments.

Blluja, 1997 describes methods of extending the upright, frontal template based face detection system to efficiently handle all in plane rotations, this achieving a rotation invariant face detection system.

a. Faces as Subject Matter

It is well known that human faces are the most photographed subject matter for the amateur and professional photographer. Thus it is possible to assume a high starting percentage for algorithms based on the existence of faces in them.

b. Orientation

The camera is usually held horizontally or vertically, in counter clockwise or clockwise in relations to the horizontal position when the picture is taken, creating what is referred to as a landscape mode or portrait mode, respectively. Thus most images are taken in either one of the three orientations, namely landscape, clockwise portrait and counterclockwise portrait. When viewing images, it is preferable to determine ahead of time the orientation of the camera at acquisition, thus eliminating a step of rotating the image and automatically orienting the image. The system may try to determine if the image was shot horizontally, which is also referred to as landscape format, where the width is larger than the height of an image, or vertically, also referred to as portrait mode, where the height of the image is larger than the width. Techniques may be used to determine an orientation of an image. Primarily these techniques include either recording the camera orientation at an acquisition time using an in camera mechanical indicator or attempting to analyze image content post-acquisition. In-camera methods, although providing precision, use additional hardware and sometimes movable hardware components which can increase the price of the camera and add a potential maintenance challenge. However, post-acquisition analysis may not generally provide sufficient precision. Knowledge of location, size and orientation of faces in a photograph, a computerized system can offer powerful automatic tools to enhance and correct such images or to provide options for enhancing and correcting images.

c. Face Recognition as a Function of Orientation

It is a well known fact for one familiar in the art of face recognition that the human visual system is very sensitive to the orientation of the faces. As a matter of fact, experiments indicated that the way the human mind stores faces is different for upright and inverted faces, as described in Endo, 1982. In particular, recognition of inverted faces is known to be a difficult perceptual task. While the human visual system performs well in recognizing different faces, performing the same task with inverted faces is significantly worse. Such results are illustrated for example in Moses, 1994, where face memory and face recognition is determined to be highly orientation dependent. A detailed review of face recognition of inverted faces is available in Valentine, 1988.

It is therefore only natural that artificial intelligence detection algorithms based on face related classifiers may have the same features of being orientation variant.

d. Image Classifiers for Scene Analysis:

SUMMARY OF THE INVENTION

Even though human beings have no problem to interpret images semantically, the challenge to do so using artificial intelligence is not that straight forward. A few methods are available to those familiar in the art of image and pattern recognition that separate images using a learning based descriptor space. Such methods are using a training set and a maximization methods of likelihood. Examples of such methods includes the Adatron (1989) method as described by Analauf et. al incorporated herein by reference. Other work includes scene analysis such as the work by Le Saux Bertrand et al (2004).

In view of the above, a method of analyzing and processing a digital image using the results of face detection algorithms within said image to determine the correct orientation of the image is provided.

A face detection algorithm with classifiers that are orientation sensitive, or otherwise referred to as rotation variant, is applied to an image, or a subsampled resolution of an image. The image is then rotated, or the classifiers are rotated, and the search is repeated for the orientations that are under question. Based on the results of the detection, the image with the highest amount of faces detected, and or the orientation with the highest face detection confidence level, is the one estimated to be the correct orientation of the image.

The digital image may be digitally-acquired and/or may be digitally-captured. Decisions for processing the digital image based on said face detection, selecting one or more parameters and/or for adjusting values of one or more parameters within the digital image may be automatically, semi-automatically or manually performed.

Values of orientation may be adjusted arbitrarily or in known intervals, e.g., of 90 degrees, such that a rotation value for the digital image may be determined.

The method may be performed within a digital acquisition device or an external device or a combination thereof. Rotation can also be applied as part of the transfer process between devices.

The face pixels may be identified, a false indication of another face within the image may be removed. The face pixels identifying may be automatically performed by an image processing apparatus, and a manual verification of a correct detection of at least one face within the image may be provided.

A method is further provided for detecting an orientation of a digital image using statistical classifier techniques. A set of classifiers are applied to a digital image in a first orientation and a first level of match between the digital image at the first orientation and the classifiers is determined. The digital image is rotated to a second orientation, and the classifiers are applied to the rotated digital image at the second orientation. A second level of match is determined between the rotated digital image at the second orientation and the classifiers. The first and second levels of match are compared. It is determined which of the first orientation and the second orientations has a greater probability of being a correct orientation based on which of the first and second levels of match, respectively, comprises a higher level of match.

The method may further include rotating the digital image to a third orientation, applying the classifiers to the rotated digital image at the third orientation, and determining a third level of match between the rotated digital image at the third orientation and the classifiers. The third level of match is compared with the first level of match or the second level of match, or both. It is determined which of two or more of the first orientation, the second orientation and the third orientation has a greater probability of being a correct orientation based on which of the corresponding levels of match is greater.

A method is also provided for detecting an orientation of a digital image using statistical classifier techniques. The method includes applying a set of classifiers to a digital image in a first orientation and determining a first level of match between the digital image at the first orientation and the classifiers. The set of classifiers is rotated a first predetermined amount, the classifiers rotated the first amount are applied to the digital image at the first orientation. A second level of match is determined between the digital image at the first orientation and the classifiers rotated the first amount. The first and second levels of match are compared, and it is determined which of the first and second levels of match is greater in order to determine whether the first orientation is a correct orientation of the digital image. A rotation of the classifiers by a second amount my be performed and the method performed with three relatively rotated sets of classifiers, and so on.

One or more processor readable storage devices are also provided having processor readable code embodied thereon. The processor readable code programs one or more processors to perform any of the methods for detecting an orientation of a digital image using statistical classifier techniques briefly summarized above.

INCORPORATION BY REFERENCE

Figure 1A:
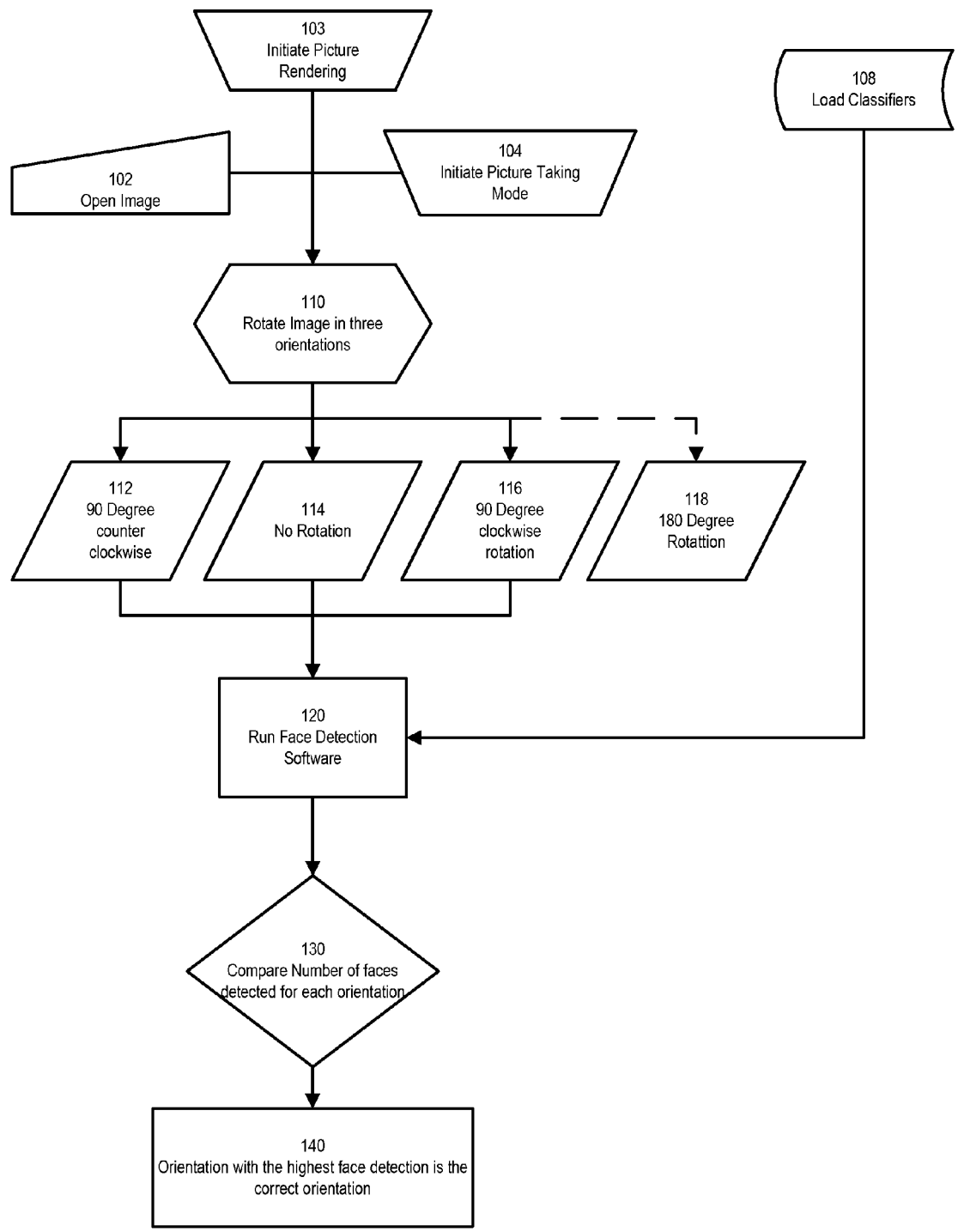
FIG. 1a is a flow diagram that illustrates a main orientation workflow based on rotation of a digital image that includes one or more faces.

What follows is a cite list of references each of which is, in addition to those references otherwise cited in this application, and that which is described as background, the invention summary, the abstract, the brief description of the drawings and the drawings themselves, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description herein:

U.S. Pat. Nos. RE33682, RE31370, 4,047,187, 4,317,991, 4,367,027, 4,638,364, 5,291,234, 5,488,429, 5,638,136, 5,710,833, 5,724,456, 5,781,650, 5,812,193, 5,818,975, 5,835,616, 5,870,138, 5,900,909, 5,978,519, 5,991,456, 6,097,470, 6,101,271, 6,128,397, 6,148,092, 6,151,073, 6,188,777, 6,192,149, 6,249,315, 6,263,113, 6,268,939, 6,282,317, 6,301,370, 6,332,033, 6,393,148, 6,404,900, 6,407,777, 6,421,468, 6,438,264, 6,456,732, 6,459,436, 6,473,199, 6,501,857, 6,504,942, 6,504,951, 6,516,154, and 6,526,161; United States published patent applications no. 2004/40013304, 2004/0223063, 2004/0013286. 2003/0071908, 2003/0052991, 2003/0025812, 2002/20102024, 2002/0172419, 2002/0114535, 2002/0105662, and 2001/0031142;

Japanese patent application no. JP5260360A2;

British patent application no. GB0031423.7; and

Anlauf, J. K. and Biehl, M.: "The adatron: and adaptive perception algorithm". Neurophysics Letters, 10:687-692, 1989.

Baluja & Rowley, "Neural Network-Based Face Detection," IEEE Transactions on Pattern Analysis and Machine Intelligence, Vol. 20, No. 1, pages 23-28, January 1998

Baluja, Shumeet in "Face Detection with In-Plane rotation: Early Concepts and Preliminary Results", Technical Report JPRC-TR-97-001

Endo, M., "Perception of upside-down faces: and analysis form the viewpoint of cue saliency", in Ellis, H. Jeeves, M., Newcombe, F, and Young, A., editors, Aspects of Face Processing, 53-58, 1986, Matnus Nijhoff Publishers Moses, Yael and Ullman, Shimon and Shimon Edelman in "Generalization to Novel Images in Upright and Inverted Faces", 1994.

Le Saux, Bertrand and Amato, Giuseppe: "Image Classifiers for Scene Analysis", International Conference on Computer Vision and Graphics (ICCVG'04), Warsaw, Poland, September 2004

Valentine, T., Upside Down Faces: A review of the effect of inversion and encoding activity upon face recognition", 1988, Acta Psychologica, 61:259-273.

Viola and Jones "Robust Real Time Object Detection", $2^{nd}$ international workshop on Statistical and Computational theories of Vision, in Vancouver, Canada, Jul. 31, 2001, Yang et al., IEEE Transactions on Pattern Analysis and Machine Intelligence, Vol. 24, no. 1, pp 34-58 (January 2002).

ILLUSTRATIVE DEFINITIONS

"Face Detection" involves the art of detecting faces in a digital image. One or more faces may be first isolated and/or identified within a larger digital image prior to further processing based at least in part on the detection of the faces. Face detection includes a process of determining whether a human face is present in an input image, and may include or is preferably used in combination with determining a position and/or other features, properties, parameters or values of parameters of the face within the input image;

"Image-enhancement" or "image correction" involves the art of modifying a digital image to improve its quality or according to another selected manual or automatic input criteria. A "global" modification is one that is applied to an entire image or substantially the entire image, while a "selective" modification is applied differently to different portions of the image or to only a selected portion of the image.

A "pixel" is a picture element or a basic unit of the composition of a digital image or any of the small discrete elements that together constitute an image;

A "digitally-captured image" includes an image that is digitally located and held in a detector, preferably of a portable digital camera or other digital image acquisition device.

A "digitally-acquired image" includes an image that is digitally recorded in a permanent file and/or preserved in a more or less permanent digital form.

"A digitally-detected image" is an image comprising digitally detected electromagnetic waves.

"Classifiers" are generally reference parameters selectively or automatically correlated or calibrated to some framework or absolute reference criteria. For example, one or more orientation classifiers in a 2-dimensional image may be configured according to a proper and/or selected orientation of a detected face within a digital image. Such classifiers may be calibrated or correlated with a detected facial orientation such that an overall digital image containing a face may be oriented according to these calibrated or correlated classifiers.

Classifiers may be statistical or absolute: Statistical classifiers assign a class $\omega_i$ so that given a pattern $\hat{y}$, the most probable $P(\omega_i|\hat{y})$ is the largest. In many cases, it is not desired to actually calculate $P(\omega_i|\hat{y})$, but rather to find (i) so that $\omega_i$ will provide the largest $P(\omega_i|\hat{y})$. The accuracy of a statistical classifier generally depends on the quality of training data and of the algorithm used for classification. The selected populations of pixels used for training should be statistically significant. This means that a minimum number of observations are generally required to characterize a particular site to some selected or acceptable threshold level of error.

Figure 2A:
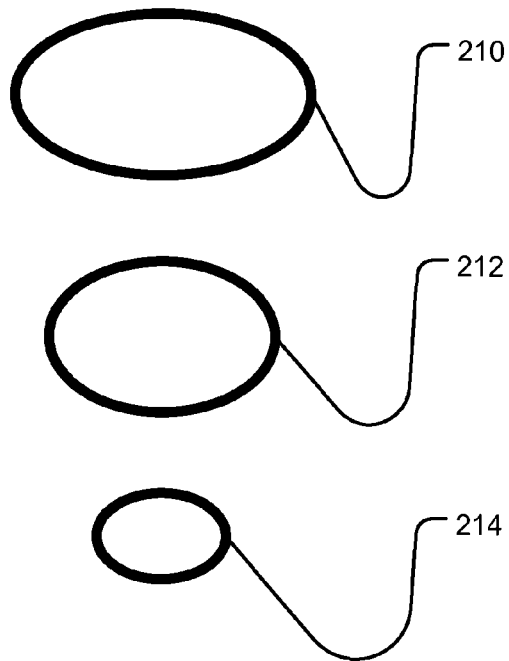
FIG. 2a illustrates an ellipse-based orientation classifier that may be used in a process in accordance with a preferred embodiment.
Figure 2B:
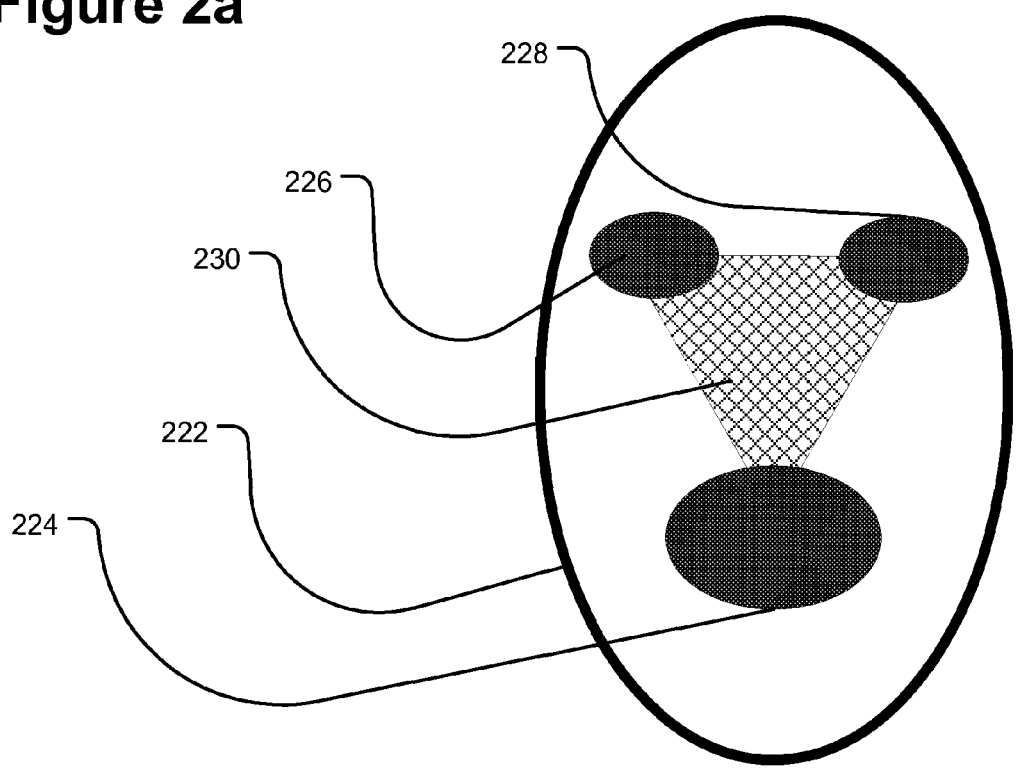
FIG. 2b illustrates an ellipse-based classifier system applied to a facial image.

FIG. 2a and FIG. 2b illustrate in a graphical form non-exhaustive examples of classifiers. Objects 210, 212, and 214 in FIG. 2a represent a simple ellipse classifier, in varying sizes. FIG. 2b illustrates a complex classifier of a face, which is made of simpler classifiers. In this case, the mouth, 224 and the eyes 226, 228 correspond to ellipse classifiers 210 and 214 as defined in FIG. 2a.

The classifiers may not necessarily be only of certain shape. More complex classifiers can be of a more abstract physical nature. Alternatively, a classifier can be of color data. For example, a color classifier may be a classifier with higher content of blue towards the top and higher content of green or brown towards the bottom.

An "image orientation" is a rotational position of an image relative to a selected or permanent coordinate or coordinate system that may itself be determined relative to an absolute spatial system, such as the earth, or a system determined or selected within a frame of a digital image. Generally herein, an image orientation is identified relative to an orientation of one or more classifiers, such as the elliptical classifiers illustrated at 2a-2b, 3b and 4a-4b.

Figure 3A:
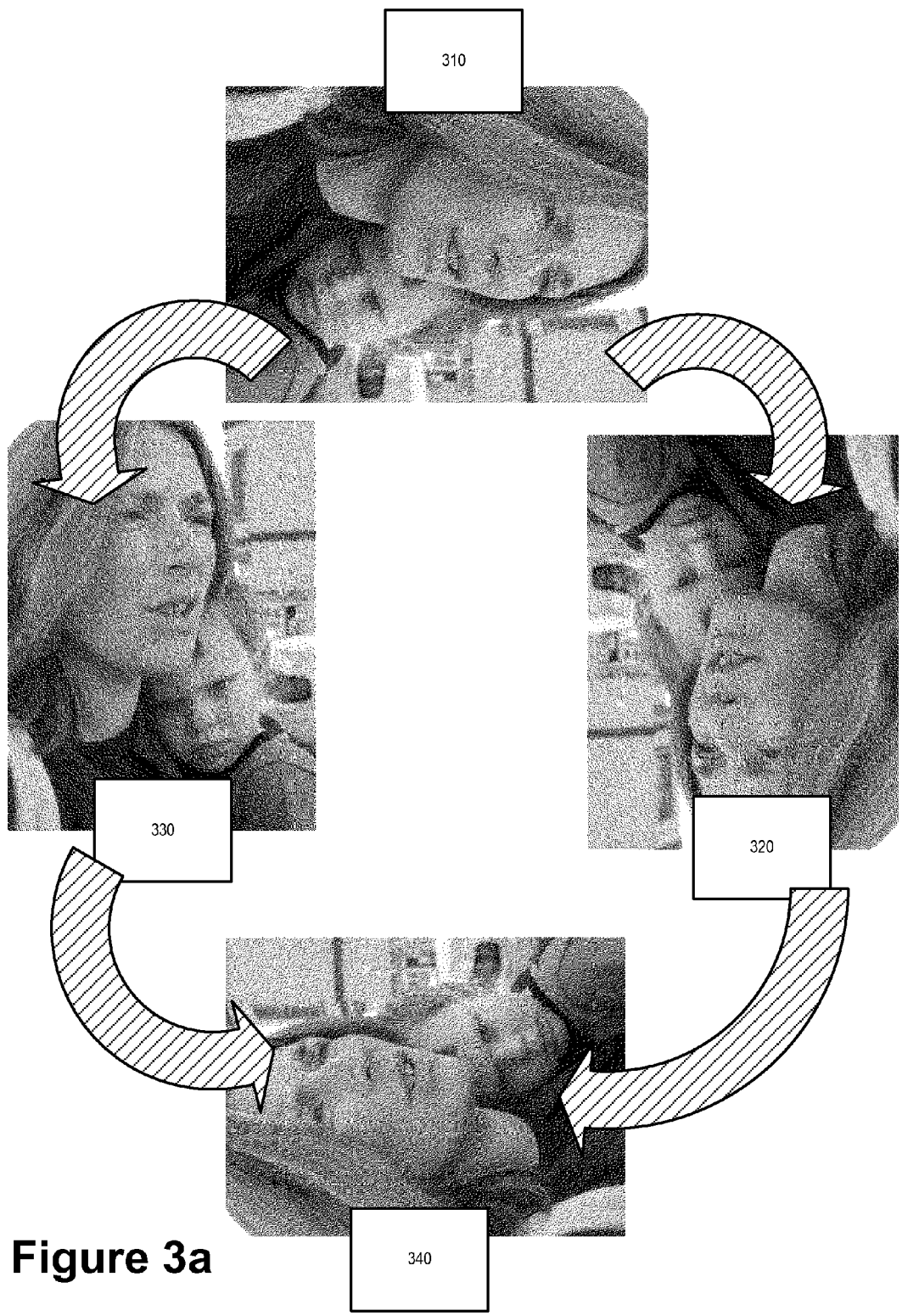
FIG. 3a illustrates four different potential orientations of a single image.

As another example, an image orientation may identified relative to a horizontal/vertical system, such as illustrated in FIG. 3a. The image 310 may be rotated relative to this coordinate system or to an orientation of one or more elliptical classifiers by 90° counter clockwise 320 or clock wise 330. A fourth orientation 340 is a 180° degree rotation which is also illustrated in FIG. 3a. For most practical reasons, a 180 degree orientation is typically not a desired or viable situation for hand held pictures. However, technically and theoretically, the up-side-down orientation can be included in the algorithm Rotational positions may be defined relative to absolute or image-based coordinates, and rotations of the image and/or of the classifiers may be of arbitrary angular extent, e.g., 1° or finer, 5°, 10°, 15°, 30°, 45°, or others, may be selected in accordance with embodiments of the invention.

Figure 3B:
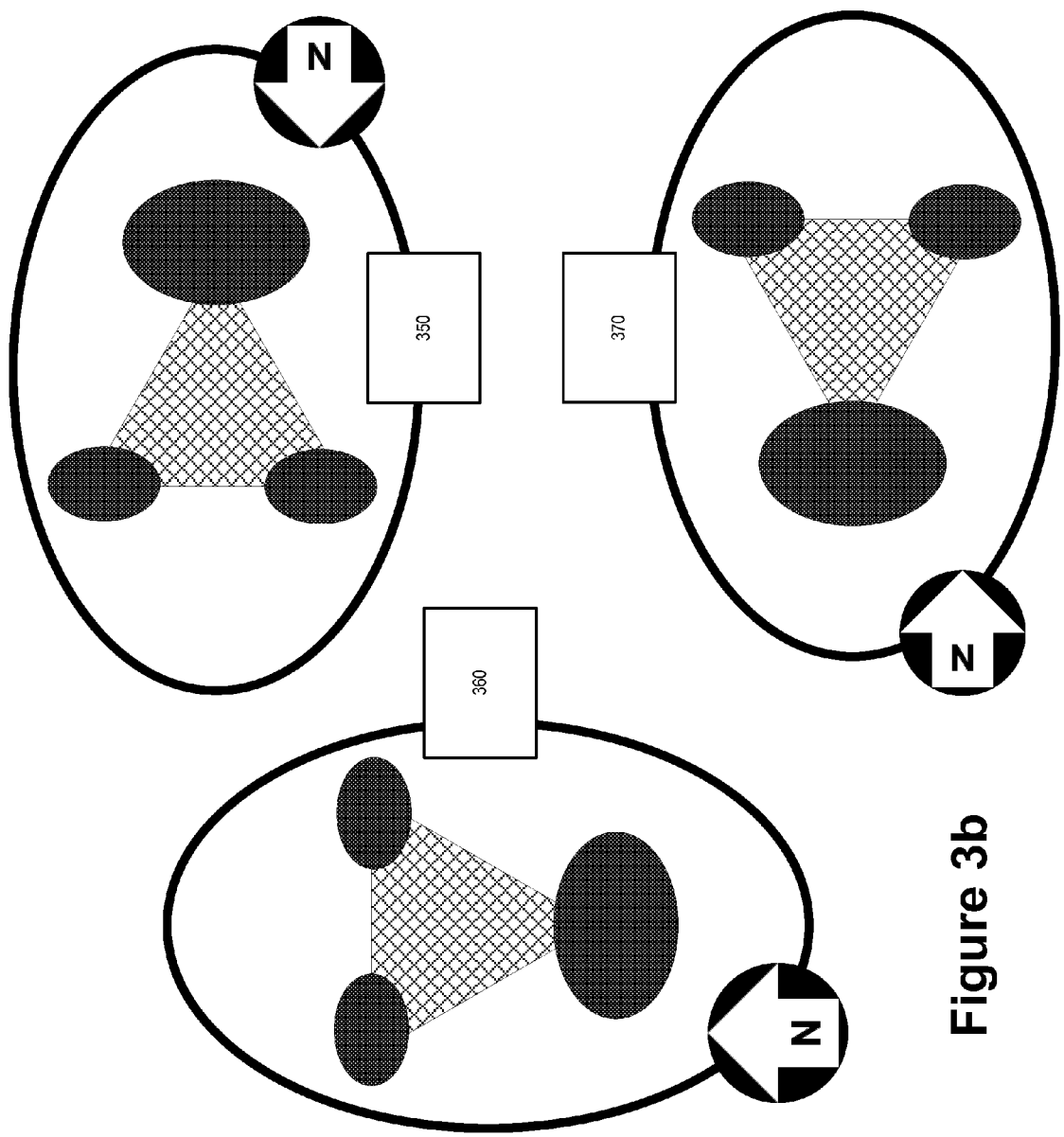
FIG. 3b illustrates different orientations of classifiers applied to a same image.

Classifier orientation is illustrated in FIG. 3b. The classifiers of FIG. 3b are oriented in three orientations corresponding to the image orientations shown. Object 360 represents a "correctly" oriented image, as selected or built-in to the digital system, block 350 represents a counter clockwise orientation, and block 370 represents a clockwise orientation. A "correct" orientation may be determined based on a combined level of match of multiple classifiers and/or on relative positions of the classifiers once matched to their respective facial regions. These regions may include the two eyes and mouth of a detected face, and may also include an outline of a person's head or entire face. The arrow labeled "N" in the example of FIG. 3b points in a direction that is selected or determined to be the "correct" vertical axis of the image. The orientations illustrated at FIG. 3b correspond to illustrative images 310, 320 and 330 in FIG. 3a.

Figure 4A:
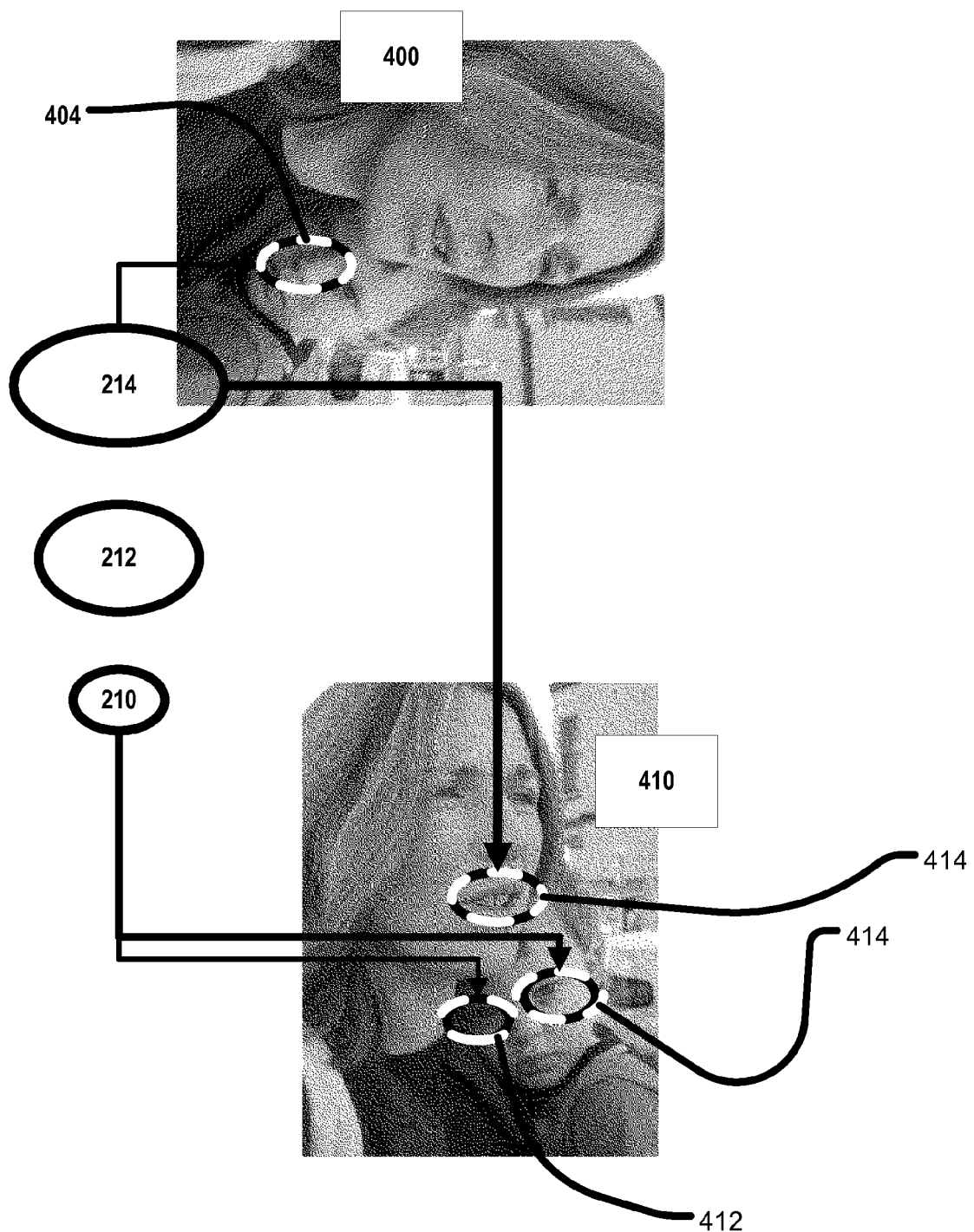
FIG. 4a illustrates a matching of ellipse-based classifiers within images.
Figure 4B:
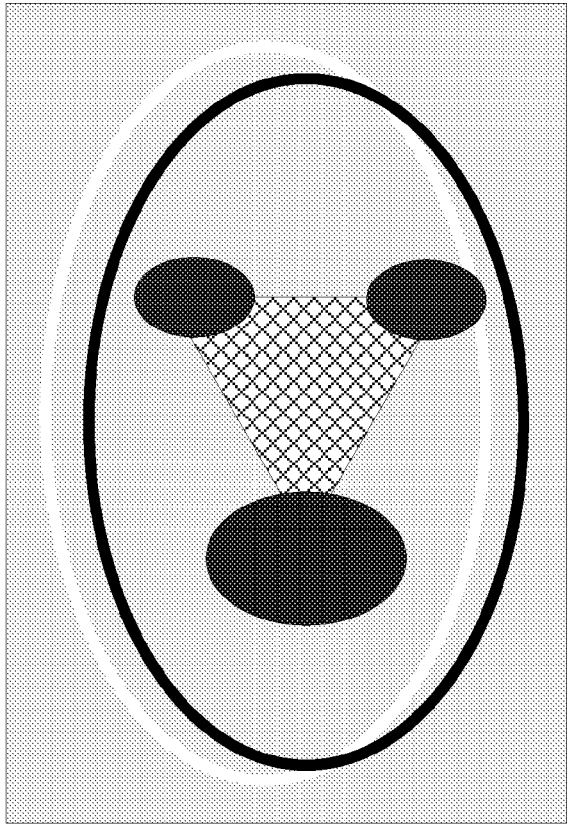
FIG. 4b illustrates a matching of complex classifiers with an image.
Figure 4B:
Figure 4B:

"Matching image classifiers to images" involves correlating or assigning classifier constructs to actual digital images or portions or sub-samplings of digital images. Such matching is illustrated at FIGS. 4a and 4b. According to FIG. 4a different sized ellipses, as already described as being examples of classifiers, e.g., ellipses 210, 212 and 214 of FIG. 2a, are matched to various objects, e.g., eyes and mouth regions, in facial images. The matching is preferably performed for different image and/or facial region orientations, e.g., 400 and 410 of FIG. 4a, to determine a correct or selected orientation of the digital image.

A correctly oriented ellipse may, however, match different objects in two orientations of an image or may match different objects than desired in images regardless of orientation. Referring to FIG. 4a, e.g., ellipse 214 matches correctly the lips 414 in image 410 but also the nose bridge 404 when the image is "incorrectly" oriented or not in the desired orientation. The smaller ellipse 410 matches both instances of eyes 412 and 413 in the correctly oriented image 410. This example illustrates an instance wherein it is not sufficient to use a single classifier, as there may be cases of false detection. This illustrates an advantage of the process of determining the orientation of faces based on statistical classifiers in accordance with a preferred embodiment of the present invention.

Concatenation is generally used herein to describe a technique wherein classifiers, objects, axes, or parameters are connected, linked, correlated, matched, compared or otherwise related according to a selected or built-in set of criteria, and/or to describe sequential performance of operation or processes in methods in accordance with embodiments of the invention. For example, an image may be determined to be properly aligned when axes of a pair of eye ellipses are determined to be collinear or the image is oriented or re-oriented such that they are made to be collinear, or when an image and/or classifiers are rotated to cause the foci of eye ellipses to form an isosceles triangle with a center of a mouth ellipse, etc.

DETAILED DESCRIPTION OF THE PREFERRED EMBODIMENTS

Preferred embodiments are described below including methods and devices for providing or suggesting options for determining image orientation automatically using face detection. A preferred embodiment includes an image processing application whether implemented in software or in firmware, as part of the image capture process, such as in a digital camera, or as part of post processing, such as a desktop, in the camera as a post processing background process or on a server application. This system receives images in digital form, where the images can be translated into a grid representation including multiple pixels.

The preferred embodiment describes a method of re-using face detection information in different orientations of the image to determine the orientation with the highest probability to be the correct one. The information regarding the location and size of faces in an image assist in determining correct orientation.

Advantages of the preferred embodiments include the ability to automatically perform or suggest or assist in the determination of the correct orientation of an image. Another advantage is that the processing may be automatically performed and/or suggested based on this information. Such automatic processing is fast enough and efficient enough to handle multiple images in close to real time, or be used for a single image as part of the image processing in the acquisition device. Many advantageous techniques are provided in accordance with preferred and alternative embodiments set forth herein. For example, this method of detection the image orientation can be combined with other methods of face detection, thus improving the functionality, and re-purposing the process for future applications.

Two or more methods of detecting faces in different orientations may be combined to achieve better accuracy and parameters of a single algorithm may be concatenated into a single parameter. The digital image may be transformed to speed up the process, such as subsampling or reducing the color depth. The digital image may be transformed to enhance the accuracy such as preprocessing stage for improving the color balance, exposure or sharpness. The digital image may post processed to enhance the accuracy such as removal of false positives as a post processing process, based on parameters and criteria outside of the face detection algorithm. Values of orientation may be adjusted such that a rotation value for the digital image is determined. This technique may be implemented for supporting arbitrary rotation or fixed interval rotation such as 90 degree rotation.

The method may be performed within any digital image capture device, which as, but not limited to digital still camera, phone handset with built in camera, web camera or digital video camera. Determining which of the sub-group of pixels belong to which of the group of face pixels may be performed. The determining of the initial values of one or more parameters of pixels may be calculated based on the spatial orientation of the one or more sub-groups that correspond to one or more facial features. The spatial orientation of the one or more sub-groups that correspond to one or more facial features may be calculated based on an axis of an ellipse fit to the sub-group. The adjusted values of pixels within the digital image may be rounded to a closest multiple of 90 degrees. The initial values may be adjusted to adjusted values for re-orienting the image to an adjusted orientation. The one or more facial features may include an eye, two eyes, two eyes and a mouth, an eye, a mouth, hairline, ears, nostrils, nose bridge, eyebrows or a nose, or combinations thereof. On a more abstract level the features used for the detection of objects in general in the image, or faces specifically may be determined through a mathematical classifiers that are either deduced via a learning process or inserted into the system. One example of such classifiers are described by Viola Jones in the paper incorporated herein by reference. Other classifiers can be the eigenfaces, which are the basis functions that define images with faces.

Each of the methods provided are preferably implemented within software and/or firmware either in the camera or with external processing equipment. The software may also be downloaded into the camera or image processing equipment. In this sense, one or more processor readable storage devices having processor readable code embodied thereon are provided. The processor readable code programs one or more processors to perform any of the above or below described methods.

FIG. 1a illustrates a process flow according to a preferred embodiment. The input is an image which can come from various sources. According to this exemplary procedure, an image may be opened by a software, firmware or other program application in block 102. The process may be initiated when a photographer takes a picture at block 103, or as an automatic background process for an application or acquisition device at block 104.

The classifiers are preferably pre-determined for the specific image classification. A detailed description of the learning process to create the appropriate classifiers can be found in the paper by Viola and Jones that has been cited and incorporated by reference hereinabove. The classifiers are loaded, at step 108, into the application.

The image is preferably rotated into three orientations at block 110. Only two or more than three orientation may alternatively be used: The preferred orientations are counter clockwise 112, no rotation 114 and clockwise, 116. Note that a fourth orientation which is the upside down 118 is technically and theoretically plausible but is not preferred due to the statistical improbability of such images. One or more images rotated by 1°, or a few seconds or minutes, or by 3° or 45°, or an arbitrary amount, may also be used.

The three images are then provided to the face detection software at block 120 and the results are analyzed at block 130. The image with the highest probability of detection of faces is determined at block 140 to be most likely the one with the right orientation.

Figure 1B:
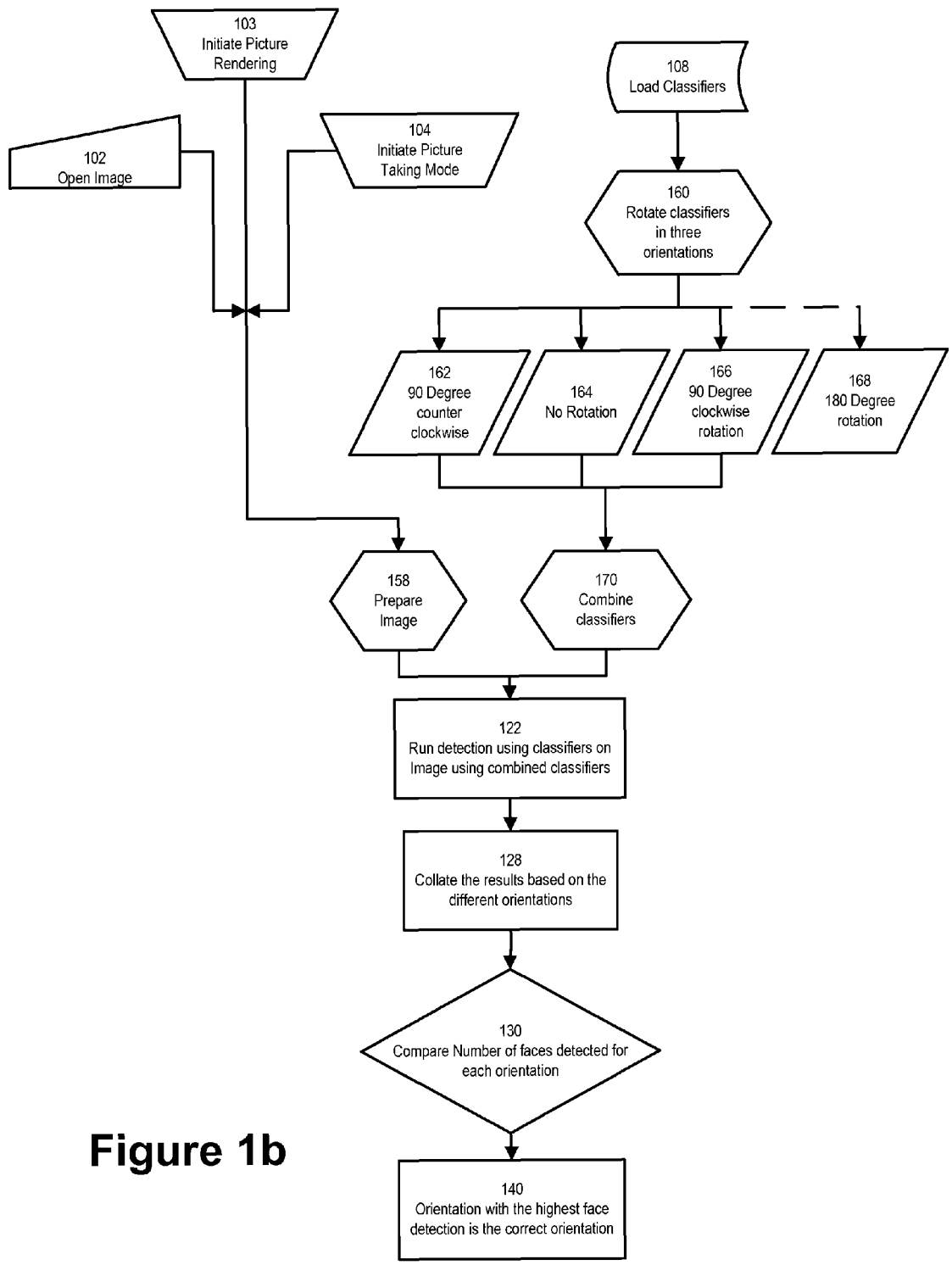
FIG. 1b is a flow diagram that illustrates a main orientation workflow based on rotation of classifiers relative to an orientation of a digital image that includes one or more faces.

FIG. 1b is an alternative embodiment, wherein the classifiers are rotated as opposed to the images. By doing so, even if the results are similar, the execution time is highly optimized because the process is preferably not repeated over three images, and is instead performed over only a single image with two, three or more times the number of classifiers. Preferably, two sets of rotated classifiers are used along with an unrotated set. According to FIG. 1b, the classifiers loaded at block 108 are rotated at block 160 to create counter clockwise classifiers 162, original classifiers 164 and clockwise classifiers 166. As explained above, if desired, a fourth set of classifiers 168 of 180 degree rotation can be generated, and in fact, any number of classifier sets may be generated according to rotations of arbitrary or selected amounts in accordance with alternative embodiments of this invention. In a third embodiment, both the image and the classifiers may be rotated.

The classifiers are preferably combined into a single set of classifiers at block 170. The concatenation of the classifiers is preferably performed in such a manner that an false eliminating process would still be optimized. Note that these operations need not be executed at the time of analysis, but can be prepared prior to running the process on an image, as a preparatory step. Also note that the two approaches may be combined, where some classifiers may or may not be used depending on the results of the previous classifies. It may be possible to merge the preferred three sets, or an arbitrary number of two or more sets, of rotated classifiers.

Part-way through, the common classifiers one would branch into the specific classifiers for each orientation. This would speed up the algorithm because the first part of the classification would be common to the three orientations.

In another embodiment, where the classifier set contains rotation invariant classifiers it is possible to reduce the number of classifiers which must be applied to an image from 3N to 3N−2M where N is the number of classifiers in the original classifier set and M is the number of rotation invariant classifiers. The image is then prepared at block 158 to run the face detection algorithm at block 122. Such preparation varies on the algorithm and can include different operations such as converting the image format, the color depth, the pixel representation etc. In some cases the image is converted, such as described by Viola and Jones, to form a pixel based representation from an integral one. In other cases the image may be subsampled to reduce computation, converted to a gray scale representation, or various image enhancement algorithms such as edge enhancement, sharpening, blurring, noise reduction etc. may be applied to the image. Numerous operations on the image in preparation may also be concatenated. The face detection algorithm is run once on the image at block 122, using the multiple set of classifiers 170. The results are then collated at block 128, according to each of the three orientations of the preferred classifier set. The number of surviving face regions for each orientation of the classifier set are next compared at block 130. The orientation with the highest number of surviving face regions is determined at block 140- to be the one with the highest likelihood orientation.

In an additional embodiment, the algorithm handles may handle cases of false detection of faces. The problem occurs where in some cases regions that are not faces are marked as potential faces. In such cases, it is not enough to count the occurrence of faces, but the probability of false detection and missed faces needs to be accounted for.

Figure 1C:
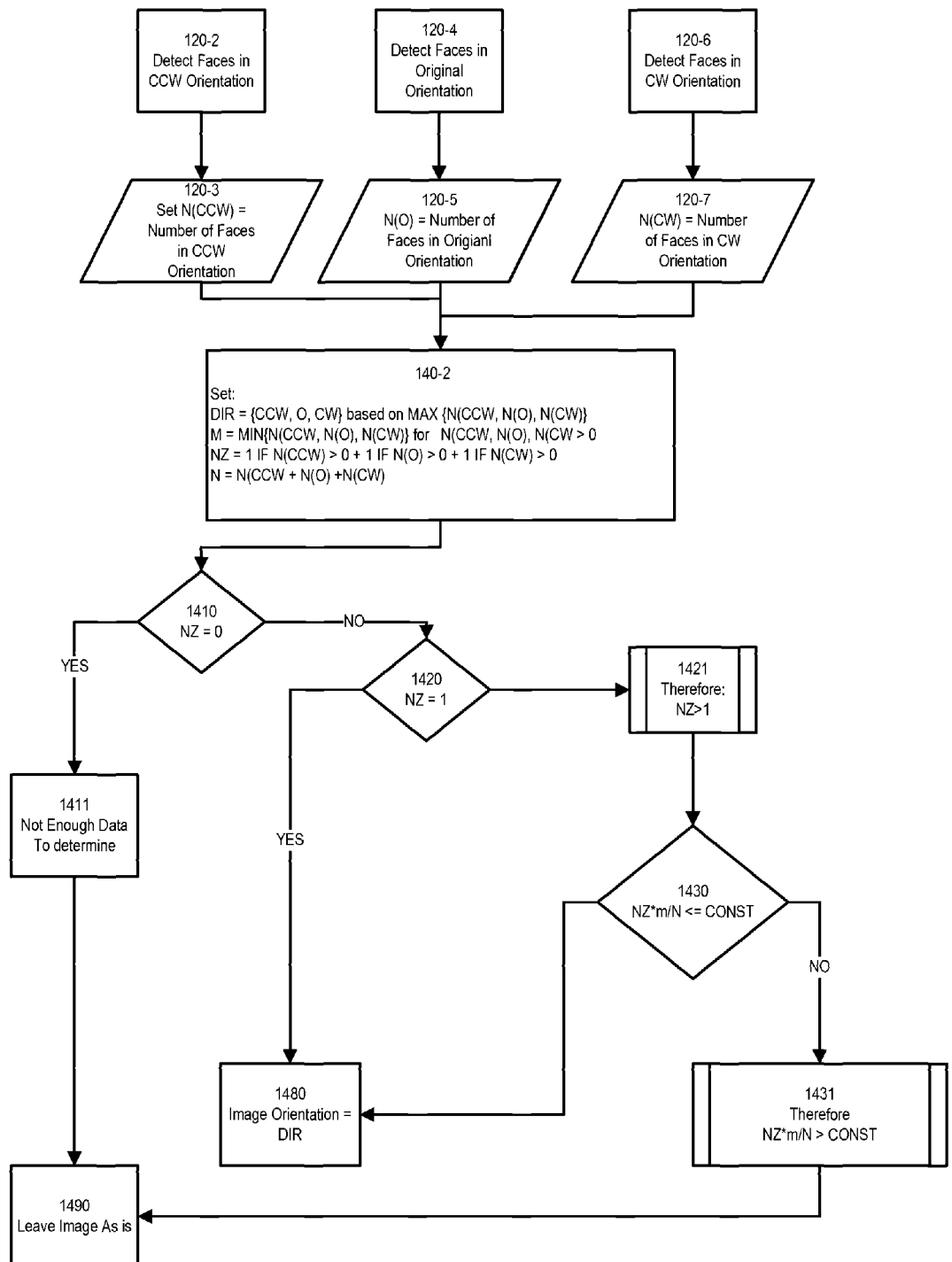
FIG. 1c describes an exemplary implementation of the process illustrated at FIG. 1a and/or FIG. 1b.

Such algorithm which is an expansion of Block 140 of FIGS. 1a and 1b is described with reference to the flow diagram illustrated at FIG. 1c:

Some representations used in the algorithm include the following:

DIR: the most populated direction and the maximal number of detected faces on any direction (DIR is on of CCW, O, CW).

M: the minimal non-zero number of detected faces on any direction (m).

NZ: the number of populated directions (directions for which we have detection).

N: the total number of detected faces.

CONST: probability factor, which is based on empirical results can be from 0.6 to 0.9.

An exemplary orientation decision may be determined as follows:

1410 NZ=0, no faces are found in the image, image orientation is, 1490 DEFAULT (keep image as it is)

1420 NZ=1 there is as single face in the image, image orientation is DIR

1421 If NZ>1

1430 if NZ*m/N<=CONST there are multiple faces, multiple orientations with a predominant orientation, image orientation is Dir Therefore 1431 NZ*m/N>CONST there are multiple faces, multiple orientations without a predominant orientation, image orientation is, 1490 DEFAULT (no decision can be taken). (keep image as it is)

Automatic Orientation detection and in particular orientation detection using faces, particularly for digital image processing applications according to preferred and alternative embodiments set forth herein, are further advantageous in accordance with various modifications of the systems and methods of the above description as may be understood by those skilled in the art, as set forth in the references cited and incorporated by reference herein and as may be otherwise described below.

For example, an apparatus according to another embodiment may be provided for detection and recognition of specific features in an image using an eigenvector approach to face detection (see, e.g., U.S. Pat. No. 5,710,833 to Moghaddam et al., incorporated by reference). Additional eigenvectors may be used in addition to or alternatively to the principal eigenvector components, e.g., all eigenvectors may be used. The use of all eigenvectors may be intended to increase the accuracy of the apparatus to detect complex multi-featured objects. Such eigenvectors are orientation sensitive, a feature that can be utilized according to this invention.

Faces may be detected in complex visual scenes and/or in a neural network based face detection system, particularly for digital image processing in accordance with preferred or alternative embodiments herein (see, e.g., U.S. Pat. No. 6,128,397 to Baluja & Rowley; and "Neural Network-Based Face Detection," IEEE Transactions on Pattern Analysis and Machine Intelligence, Vol. 20, No. 1, pages 23-28, January 1998 by the same authors, each reference being hereby incorporated by reference. An image may be rotated prior to the application of the neural network analysis in order to optimize the success rate of the neural-network based detection (see, e.g., U.S. Pat. No. 6,128,397, incorporated by reference). This technique is particularly advantageous when faces are oriented vertically. Face detection in accordance with preferred and alternative embodiments, and which are particularly advantageous when a complex background is involved, may use one or more of skin color detection, spanning tree minimization and/or heuristic elimination of false positives (see, e.g., U.S. Pat. No. 6,263,113 to Abdel-Mottaleb et al., incorporated by reference). Alternatively, according to this invention, the neural-network classifiers may be rotated, to determine the match based the image orientation, as described by this invention.

In the context of automatic image rotation, and determining image orientation, an embodiment including electrical, software and/or firmware components that detect blue sky within images may be included (see, e.g., U.S. Pat. No. 6,504,951 to Luo et al., incorporated by reference) This feature allows image orientation to be determined once the blue-sky region(s) are located and analyzed in an image. In accordance with an alternative embodiment, other image aspects are also used in combination with blue sky detection and analysis, and in particular the existence of facial regions in the image, to determine the correct orientation of an image. In accordance with this invention, such filters, including color based filters with specific orientation characteristics to them can be introduced into the system as added classifiers, this expanding the scope of the invention form face detection to generic automatic orientation detection using generic image object analysis.

Another embodiment includes scene recognition method and a system using brightness and ranging mapping (see, e.g., US published patent application 2001/0031142 to Whiteside, incorporated by reference). Auto-ranging and/or brightness measurement may be used as orientation specific features for this invention.

In further preferred and alternative embodiments, the orientation may be suggested to a user in the acquisition device after the image has been acquired or captured by a camera (see, e.g., U.S. Pat. No. 6,516,154 to Parulski et al., incorporated by reference). According to these embodiments, a user may confirm the new orientation before saving a picture or before deciding to re-save or delete the picture. The user may choose to re-take a picture using different settings on the camera. Suggestion for improvements may be made by the camera user-interface.

In preferred embodiments herein, automatically or semi-automatically improving the appearance of faces in images based on automatically and/or manually detecting such facial images in the digital image is an advantageous feature (see also US published patent application 20020172419, to Lin et al., incorporated by reference) Lightness contrast and color level modification of an image may be performed to produce better results. Moreover, using such information for detecting orientation, may provide assistance as part of an in-camera acquisition process to perform other face related operations such as composition or a slide show as may be recited at U.S. patent application Ser. No. 10/608,772, filed Jun. 26, 2003, hereby incorporated by reference.

Based on the detection of the correct orientation, Image enhancement according to preferred and alternative embodiment herein may be applied to a face region or face regions only, or the enhancement may be applied to the entire image, or selective and distinct corrections may be applied to both background and foreground regions, particularly facial regions, based on knowledge of the presence of faces in the image and/or other image regions such as blue sky or other detectable features.

In further embodiments, various schemes may be used for selecting an area or areas of interest from an electronically captured image, most preferably areas including faces or facial regions (see also UK patent application number GB0031423.7 entitled "automatic cropping of electronic images", incorporated by reference). Regions of interest may be automatically or semi-automatically selected within an image in response to a selection signal (see, e.g., US published patent application 2003/0025812, incorporated by reference).

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

What is claimed is:

1. A method of detecting an orientation of a digital image using statistical classifier techniques, comprising:
   using a processor;
   acquiring a digital image;
   cropping the digital image including selecting a facial region within the digital image excluding one or more regions of the digital image outside of said facial region to obtain a cropped image including said facial region;
   applying a set of face detection classifiers to the cropped image in a first orientation and determining a first level of match between said cropped image at said first orientation and said classifiers;
   rotating said cropped image to a second orientation to obtain a rotated image, applying the classifiers to said rotated image at said second orientation, and determining a second level of match between said rotated image at said second orientation and said classifiers;
   comparing said first and second levels of match between said classifiers and said cropped image and between said classifiers and said rotated image, respectively; and
   determining which of the first orientation and the second orientations has a greater probability of being a correct orientation based on which of the first and second levels of match, respectively, comprises a higher level of match.

2. The method of claim 1, further comprising, prior to applying said classifiers to said cropped image, color conversion, edge enhancement, blurring, sharpening, tone reproduction correction, exposure correction, gray scale transformation, region segmentation, further cropping, or combinations thereof.

3. The method of claim 1, wherein said classifiers comprise elliptical classifiers.

4. The method of claim 3, wherein said elliptical classifiers are oriented at known orientations.

5. The method of claim 1, wherein said classifiers correspond to regions of a detected face.

6. The method of claim 5, wherein said regions include an eye, two eyes, a nose, a mouth, or an entire face, or combinations thereof.

7. A method of detecting an orientation of a digital image using statistical classifier techniques comprising:

using a processor;

acquiring a digital image;

cropping the digital image including selecting a facial region within the digital region excluding one or more regions of the digital image outside of said facial region to obtain a cropped image including said facial region;

applying a set of face detection classifiers to the cropped image in a first orientation and determining a first level of match between said cropped image at said first orientation and said classifiers;

rotating said set of classifiers a first predetermined amount, applying the classifiers rotated said first amount to said cropped image at said first orientation, and determining a second level of match between said cropped image at said first orientation and said classifiers rotated said first amount;

comparing said first and second levels of match between said classifiers and said digital image and between said rotated classifiers and said cropped image, respectively; and determining which of the first and second levels of match, respectively, comprises a higher level of match in order to determine whether said first orientation is a correct orientation of said digital image.

8. The method of claim 7, further comprising, prior to applying said classifiers to said cropped image, color conversion, edge enhancement, blurring, sharpening, tone reproduction correction, exposure correction, gray scale transformation, region segmentation, further cropping, or combinations thereof.

9. The method of claim 7, wherein said classifiers comprise elliptical classifiers.

10. The method of claim 9, wherein said elliptical classifiers are initially oriented at known orientations and, when rotated by said first and second amounts, are rotated to different known orientations.

11. The method of claim 7, wherein said classifiers correspond to regions of a detected face.

12. The method of claim 11, wherein said regions include an eye, two eyes, a nose, a mouth, or an entire face, or combinations thereof.

13. One or more non-transitory computer readable storage devices having processor readable code embodied thereon, said processor readable code for programming one or more processors to perform a method of detecting an orientation of a digital image using statistical classifier techniques, the method comprising:

applying a set of face detection classifiers to a digital image in a first orientation and determining a first level of match between said digital image at said first orientation and said classifiers;

cropping the digital image including selecting a facial region within the digital image excluding one or more regions of the digital image outside of said facial region to obtain a cropped image including said facial region;

applying said classifiers to said cropped image and determining said first level of match between said cropped image and said classifiers;

rotating said cropped image to a second orientation, applying the classifiers to the rotated image at said second orientation, and determining a second level of match between the rotated image at said second orientation and said classifiers;

comparing said first and second levels of match between said classifiers and said cropped image and between said classifiers and said rotated image, respectively; and determining which of the first orientation and the second orientations has a greater probability of being a correct orientation based on which of the first and second levels of match, respectively, comprises a higher level of match.

14. The one or more storage devices of claim 13, wherein the method further comprises, prior to applying said classifiers to said cropped image, color conversion, edge enhancement, blurring, sharpening, tone reproduction correction, exposure correction, gray scale transformation, region segmentation, further cropping, or combinations thereof.

15. The one or more storage devices of claim 13, wherein said classifiers comprise elliptical classifiers.

16. The one or more storage devices of claim 15, wherein said elliptical classifiers are oriented at known orientations.

17. The one or more storage devices of claim 13, wherein said classifiers correspond to regions of a detected face.

18. The one or more storage devices of claim 17, wherein said regions include an eye, two eyes, a nose, a mouth, or an entire face, or combinations thereof.

19. One or more non-transitory computer readable storage devices having processor readable code embodied thereon, said processor readable code for programming one or more processors to perform a method of detecting an orientation of a digital image using statistical classifier techniques, the method comprising:

applying a set of face detection classifiers to a digital image in a first orientation and determining a first level of match between said digital image at said first orientation and said classifiers;

cropping the digital image including selecting a facial region within the digital image excluding one or more regions of the digital image outside of said facial region to obtain a cropped image including said facial region;

applying said classifiers to said cropped image and determining said first level of match between said cropped image and said classifiers;

rotating said set of classifiers a first predetermined amount, applying the classifiers rotated said first amount to said cropped image at said first orientation, and determining a second level of match between said cropped image at said first orientation and said classifiers rotated said first amount;

comparing said first and second levels of match between said classifiers and said cropped image and between said rotated classifiers and said cropped image, respectively; and determining which of the first and second levels of match, respectively, comprises a higher level of match in order to determine whether said first orientation is a correct orientation of said digital image.

20. The one or more storage devices of claim 19, wherein the method further comprises, prior to applying said classifiers to said cropped image, color conversion, edge enhancement, blurring, sharpening, tone reproduction correction, exposure correction, gray scale transformation, region segmentation, further cropping, or combinations thereof.

21. The one or more storage devices of claim 19, wherein said classifiers comprise elliptical classifiers.

22. The one or more storage devices of claim 21, wherein said elliptical classifiers are initially oriented at known orientations and, when rotated by said first and second amounts, are rotated to different known orientations.

23. The one or more storage devices of claim 19, wherein said classifiers correspond to regions of a detected face.

24. The one or more storage devices of claim 23, wherein said regions include an eye, two eyes, a nose, a mouth, or an entire face, or combinations thereof.

25. A portable digital camera, comprising:
one or more optics and a sensor for acquiring a digital image,
a processor, and
one or more processor readable storage devices having processor readable code embodied thereon for programming the processor to perform a method of detecting an orientation of a digital image using statistical classifier techniques, wherein the method comprises:
applying a set of face detection classifiers to a digital image in a first orientation and determining a first level of match between said digital image at said first orientation and said classifiers;
cropping the digital image including selecting a facial region within the digital image excluding one or more regions of the digital image outside of said facial region to obtain a cropped image including said facial region;
applying said classifiers to said cropped image and determining said first level of match between said cropped image and said classifiers;
rotating said cropped image to a second orientation, applying the classifiers to the rotated image at said second orientation, and determining a second level of match between the rotated image at said second orientation and said classifiers;
comparing said first and second levels of match between said classifiers and said cropped image and between said classifiers and said rotated image, respectively; and
determining which of the first orientation and the second orientations has a greater probability of being a correct orientation based on which of the first and second levels of match, respectively, comprises a higher level of match.

26. The camera of claim 25, wherein the method further comprises, prior to applying said classifiers to said cropped image, color conversion, edge enhancement, blurring, sharpening, tone reproduction correction, exposure correction, gray scale transformation, region segmentation, further cropping, or combinations thereof.

27. The camera of claim 25, wherein said classifiers comprise elliptical classifiers.

28. The camera of claim 27, wherein said elliptical classifiers are oriented at known orientations.

29. The camera of claim 25, wherein said classifiers correspond to regions of a detected face.

30. The camera of claim 29, wherein said regions include an eye, two eyes, a nose, a mouth, or an entire face, or combinations thereof.

31. A portable digital camera, comprising:
one or more optics and a sensor for acquiring a digital image,
a processor, and
one or more processor readable storage devices having processor readable code embodied thereon for programming the processor to perform a method of detecting an orientation of a digital image using statistical classifier techniques, wherein the method comprises:
applying a set of face detection classifiers to a digital image in a first orientation and determining a first level of match between said digital image at said first orientation and said classifiers;
cropping the digital image including selecting a facial region within the digital image excluding one or more regions of the digital image outside of said facial region to obtain a cropped image including said facial region;
applying said classifiers to said cropped image and determining said first level of match between said cropped image and said classifiers;
rotating said set of classifiers a first predetermined amount, applying the classifiers rotated said first amount to said cropped image at said first orientation, and determining a second level of match between said cropped image at said first orientation and said classifiers rotated said first amount;
comparing said first and second levels of match between said classifiers and said cropped image and between said rotated classifiers and said cropped image, respectively; and
determining which of the first and second levels of match, respectively, comprises a higher level of match in order to determine whether said first orientation is a correct orientation of said digital image.

32. The camera of claim 31, wherein the method further comprises, prior to applying said classifiers to said cropped image, color conversion, edge enhancement, blurring, sharpening, tone reproduction correction, exposure correction, gray scale transformation, region segmentation, further cropping, or combinations thereof.

33. The camera of claim 31, wherein said classifiers comprise elliptical classifiers.

34. The camera of claim 33, wherein said elliptical classifiers are initially oriented at known orientations and, when rotated by said first and second amounts, are rotated to different known orientations.

35. The camera of claim 31, wherein said classifiers correspond to regions of a detected face.

36. The camera of claim 35, wherein said regions include an eye, two eyes, a nose, a mouth, or an entire face, or combinations thereof.

* * * * *